United States Patent
Li

(10) Patent No.: US 12,130,627 B2
(45) Date of Patent: Oct. 29, 2024

(54) METHOD FOR DETERMINING TERMINATION OF OBSTACLE-CROSSING, AND METHOD FOR CONTROLLING OBSTACLE-CROSSING, CHIP, AND ROBOT

(71) Applicant: AMICRO SEMICONDUCTOR CO., LTD., Guangdong (CN)

(72) Inventor: Ming Li, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 76 days.

(21) Appl. No.: 17/783,660

(22) PCT Filed: Nov. 24, 2020

(86) PCT No.: PCT/CN2020/131189
§ 371 (c)(1),
(2) Date: Jun. 9, 2022

(87) PCT Pub. No.: WO2022/000960
PCT Pub. Date: Jan. 6, 2022

(65) Prior Publication Data
US 2023/0152809 A1    May 18, 2023

(30) Foreign Application Priority Data

Jun. 30, 2020   (CN) .......................... 202010614372.9

(51) Int. Cl.
G05D 1/00     (2024.01)
(52) U.S. Cl.
CPC ................................ G05D 1/0214 (2013.01)
(58) Field of Classification Search
CPC ...... G05D 1/0214; G05D 3/12; G05D 1/0217; G05D 1/0274; G05D 1/0227; B25J 9/161;
(Continued)

(56) References Cited

U.S. PATENT DOCUMENTS 10,369,695 B2 *   8/2019   Lee ..................... B25J 9/1664
10,444,763 B2 *  10/2019   Myers ................ B60W 30/143
(Continued)

FOREIGN PATENT DOCUMENTS

CN       106324619 A    1/2017
CN       106527423 A    3/2017
(Continued)

OTHER PUBLICATIONS

The extended European search report of the corresponding EP patent application No. 20943079.2, mail date May 15, 2023.

*Primary Examiner* — Huan Le
(74) *Attorney, Agent, or Firm* — Samson G. Yu

(57) ABSTRACT

A method for determining a termination of an obstacle-crossing, a method for controlling an obstacle-crossing control, a chip, and a robot. The obstacle-crossing termination determination method includes: when a robot walks along an edge according to a pre-planned shortest predicted path along the edge, selecting a second preset inflection point set, which meets a guiding condition, from a preset navigation path; an optimal inflection point is acquired from the second preset inflection point set, which meets the guiding condition; whether an obstacle is marked on a line segment which connects the optimal inflection point to the current position of the robot is determined; if so, the current obstacle crossing performed by the robot is not determined to be terminated; otherwise, the current obstacle crossing performed by the robot is determined to be terminated.

20 Claims, 2 Drawing Sheets

(58) Field of Classification Search
CPC ...... B25J 9/1661; B25J 9/1664; B25J 1/1666; B25J 19/02
See application file for complete search history.

(56) References Cited

U.S. PATENT DOCUMENTS

| | | | |
|---|---|---|---|
| 10,606,269 | B2 | 3/2020 | Millard et al. |
| 11,977,390 | B2 * | 5/2024 | Lai .......................... G05D 1/247 |
| 2017/0120448 | A1 | 5/2017 | Lee et al. |
| 2017/0241790 | A1 | 8/2017 | Yoshikawa et al. |

FOREIGN PATENT DOCUMENTS

| | | |
|---|---|---|
| CN | 107065872 A | 8/2017 |
| CN | 107560620 A | 1/2018 |
| CN | 109443363 A | 3/2019 |
| CN | 109827592 A | 5/2019 |
| CN | 109864666 A | 6/2019 |
| CN | 109871021 A | 6/2019 |
| CN | 110393482 A | 11/2019 |
| CN | 110487279 A | 11/2019 |
| CN | 111090282 A | 5/2020 |
| CN | 111273647 A | 6/2020 |
| CN | 111906779 A | 11/2020 |
| JP | 2004042148 A | 2/2004 |
| JP | 2007179394 A | 7/2007 |
| JP | 2007272677 A | 10/2007 |
| JP | 2011034518 A | 2/2011 |
| JP | 2013257743 A | 12/2013 |
| JP | 2017151687 A | 8/2017 |
| WO | 2018188200 A1 | 10/2018 |

* cited by examiner

METHOD FOR DETERMINING TERMINATION OF OBSTACLE-CROSSING, AND METHOD FOR CONTROLLING OBSTACLE-CROSSING, CHIP, AND ROBOT

CROSS-REFERENCE TO RELATED APPLICATION

The present disclosure is a national stage filing of PCT Application No. PCT/CN2020/131189 filed on Nov. 24, 2020, which claims priority to Chinese patent application No. 202010614372.9, filed on Jun. 30, 2020, and entitled "Method for Establishing Map Traversal Blocks of Global Grid Map, Chip, and Mobile Robot", the contents of which are hereby incorporated by reference in its entirety.

TECHNICAL FIELD

The present disclosure relates to the technical field of obstacle crossing performed by a robot along an edge, and in particular, to a method for obstacle-crossing termination determination, and a method for obstacle-crossing control, a chip, and a robot.

BACKGROUND ART

Robot navigation controlling is to control a robot to walk from one coordinate point of a map to another coordinate point. Generally, a path is first searched from the map, and then the robot walks according to the path, until the robot reaches a target point. However, in a conventional visual sweeping robot, due to factor impacts that the precision of the map is not high enough, the marking of a map obstacle is not accurate enough, and the robot cannot accurately walk according to a navigation path, during the walking of the robot around the obstacle, the robot does not select a navigation direction that can be separated from the obstacle, but goes along an edge of the obstacle endlessly. When the robot crosses the obstacle along the edge to a certain extent, the robot can think this navigation cannot be navigated or deviates from an original navigation target point, so that the robot can give up this navigation. As a result, the success rate and navigation efficiency of the obstacle crossing of the robot are reduced.

SUMMARY

A method for determining a termination of an obstacle-crossing includes: a second preset inflection point set that meeting a guiding condition is selected from a preset navigation path when a robot walks along an edge according to a pre-planned shortest predicted path along the edge, where the navigation path is set before the robot starts navigation, the shortest predicted path along the edge is planned and selected when the robot collides with an obstacle during the navigation; an optimal inflection point is acquired from the second preset inflection point set that meeting the guiding condition, so as to cause the optimal inflection point to be an inflection point that a distance between all of the inflection points of the second preset inflection point set that meeting the guiding condition and a current position of the robot is closest to an obstacle-crossing determination threshold value; and whether the obstacle is marked on a line segment that connects the optimal inflection point and the current position of the robot is determined, in a case that the obstacle is marked on the line segment that connects the optimal inflection point and the current position of the robot, a current obstacle crossing performed by the robot is determined to be not terminated, otherwise, the current obstacle crossing performed by the robot is determined to be terminated.

Optionally, the method for acquiring the optimal inflection point from the second preset inflection point set that meeting the guiding condition, so as to cause the optimal inflection point to be the inflection point that the distance between all of the inflection points of the second preset inflection point set that meeting the guiding condition and the current position of the robot is closest to the obstacle-crossing determination threshold value includes: the obstacle-crossing determination threshold value is preset; a distance between each inflection point in the second preset inflection point set that meeting the guiding condition and the current position of the robot is calculated respectively, and then the distances are subtracted from the obstacle-crossing determination threshold value to acquire absolute values of corresponding difference values; and the absolute values of the difference values between the distance between each inflection point in the second preset inflection point set that meeting the guiding condition and the current position of the robot and the obstacle-crossing determination threshold value are compared, the inflection point corresponding to the minimum absolute value of the difference values is selected as the optimal inflection point, so as to cause the optimal inflection point to be the inflection point that the distance between all of the inflection points of the second preset inflection point set that meeting the guiding condition and the current position of the robot is closest to the obstacle-crossing determination threshold value.

Optionally, the method for determining whether the obstacle is marked on the line segment that connects the optimal inflection point and the current position of the robot, in a case that the obstacle is marked on the line segment that connects the optimal inflection point and the current position of the robot, the current obstacle crossing performed by the robot is determined to be not terminated, otherwise, the obstacle crossing performed by the robot is determined to be terminated includes: on a line segment that connects the current position of the robot and the optimal inflection point, whether grid coordinates passed by the line segment have a same grid coordinate as a coordinate of an obstacle point pre-marked on a grid map is determined one by one, in a case that the grid coordinates passed by the line segment have the same grid coordinate as the coordinate of the obstacle point pre-marked on a grid map, there is an obstacle on the line segment that connects the current position of the robot and the optimal inflection point is determined, and the current obstacle crossing performed by the robot is determined to be not terminated, otherwise, there is no obstacle on the line segment that connects the current position of the robot and the optimal inflection point is determined, and the current obstacle crossing performed by the robot is determined to be terminated.

Optionally, the obstacle-crossing termination determination method further includes: whether a rotation angle and a walking mileage of the robot along the edge within preset time along the edge meet corresponding limiting conditions is determined during a process of the robot walking along the edge according to the pre-planned shortest predicted path along the edge, in a case that the rotation angle and the walking mileage of the robot along the edge within the preset time along the edge meet corresponding limiting conditions during the process of the robot walking along the edge according to the pre-planned shortest predicted path along the edge, the robot is determined to not trapped in a same position, and the current obstacle crossing performed by the robot is determined to be not terminated, otherwise, the robot is trapped in the same position, to determine that the current obstacle crossing performed by the robot is determined to be terminated.

Optionally, the method for determining whether the rotation angle and the walking mileage of the robot along the edge within the preset time along the edge meet the corresponding limiting conditions during the process of the robot walking along the edge according to the pre-planned shortest predicted path along the edge, in a case that the rotation angle and the walking mileage of the robot along the edge within the preset time along the edge meet corresponding limiting conditions during the process of the robot walking along the edge according to the pre-planned shortest predicted path along the edge, the robot is not trapped in the same position is determined, otherwise, the robot is trapped in the same position is determined specifically includes: when the time for timing the robot walking along the edge reaches the preset time along the edge, the robot is not trapped in the same position is determined, and the current obstacle crossing performed by the robot is determined to be not terminated, if the rotation angle of the robot along the edge is determined to be less than or equal to a preset maximum rotation angle and the walking mileage of the robot along the edge is determined to be less than or equal to a preset maximum distance along the edge; and when the time for timing the robot walking along the edge reaches or exceeds the preset time along the edge, the robot is trapped in the same position is determined, and the current obstacle crossing performed by the robot is determined to be terminated, if the rotation angle of the robot along the edge is determined to be greater than the preset maximum rotation angle and the walking mileage of the robot along the edge is determined to be greater than the preset maximum distance along the edge. The rotation angle of the robot along the edge is a result of accumulating angle increments of a gyroscope that is regularly read by the robot.

Optionally, a method for planning the shortest predicted path along the edge includes: a predicted path along the edge configured to cause the robot to cross an obstacle is planned first, and a first preset inflection point set that meeting the guiding condition is selected from the preset navigation path, where the navigation path connected by the inflection points is preset for the robot, the inflection points are configured to guide the robot to move to a final navigation target point, and the predicted path along the edge comprises two predicted paths along the edge with opposite directions along the edge; and then according to distance information between all of behavior points along the edge on each predicted path along the edge and the inflection points of the first preset inflection point set that meeting the guiding condition on the same navigation path, the predicted path along the edge with a minimum deviation from the navigation path is selected as the shortest predicted path along the edge.

Optionally, the method for according to the distance information between all of the behavior points along the edge on each predicted path along the edge and the inflection points of the first preset inflection point set that meeting the guiding condition on the same navigation path, selecting the predicted path along the edge with the minimum deviation from the navigation path, to cause the robot to walk in a direction along the edge of the selected predicted path along the edge after colliding the obstacle so as to implement rapid obstacle crossing includes: the predicted path along the edge includes a left predicted path along the edge and a right predicted path along the edge, and a direction along the edge of the left predicted path along the edge being opposite to a direction along the edge of the right predicted path along the edge; distances between the inflection points of the first preset inflection point set that meeting the guiding condition of the navigation path and a same behavior point along the edge on the left predicted path along the edge is calculated, the distances are summed to obtain a left local distance sum generated by the behavior point along the edge relative to the first preset inflection point set that meeting the guiding condition; then the foregoing calculation step is repeated to obtain left local distance sums generated by each behavior point along the edge relative to the first preset inflection point set that meeting the guiding condition, and then the left local distance sums are added to acquire a total sum of left distances generated by the left predicted path along the edge relative to the first preset inflection point set that meeting the guiding condition, which is configured to indicated the degree of deviation of the left predicted path along the edge relative to the navigation path; meanwhile, distances between the inflection points of the first preset inflection point set that meeting the guiding condition of the navigation path and a same behavior point along the edge on the right predicted path along the edge is calculated, the distances are summed to obtain right local distance sums generated by the behavior point along the edge relative to the first preset inflection point set that meeting the guiding condition; then the foregoing calculation step is repeated to obtain a right local distance sum generated by each behavior point along the edge relative to the first preset inflection point set that meeting the guiding condition, and then the right local distance sums are added to acquire a total sum of right distances generated by the right predicted path along the edge relative to the first preset inflection point set that meeting the guiding condition, which is configured to indicated the degree of deviation of the right predicted path along the edge relative to the navigation path; when the total sum of left distances is greater than the total sum of right distances, the right predicted path along the edge is determined as the predicted path along the edge with the minimum deviation from the navigation path, and the right predicted path along the edge is selected as the shortest predicted path along the edge; and when the total sum of right distances is greater than the total sum of left distances, the left predicted path along the edge is determined as the predicted path along the edge with the minimum deviation from the navigation path, and the left predicted path along the edge is selected as the shortest predicted path along the edge. The smaller the total sum of right distances is, the smaller the deviation of the right predicted path along the edge from the navigation path is; and the smaller the total sum of left distances is, the smaller the deviation of the left predicted path along the edge from the navigation path is.

Optionally, before walking according to the currently planned shortest predicted path along the edge, the method further includes: whether a variation of coordinate positions where the robot is located within preset time is greater than a distance stabilization threshold value is determined, in a case that the variation of the coordinate positions where the robot is located within preset time is greater than the distance stabilization threshold value, the robot is controlled to plan two predicted paths along the edge with opposite directions along the edge and configured to cause the robot to cross the obstacle, otherwise, the robot is controlled to change the direction along the edge, so as to cause the robot to walk in a direction opposite to the currently determined direction along the edge, the currently determined direction along the edge including a preset direction along the edge when the robot is powered on and a direction along the edge of the predicted path along the edge with the minimum deviation from the navigation path that is selected last time; and wherein the robot is controlled to walk in the direction opposite to the currently determined direction along the edge if it is determined that the two predicted paths along the edge with opposite directions along the edge and configured to cause the robot to cross the obstacle are unable to be planned. The distance stabilization threshold value is set to a diameter of a body of the robot.

Optionally, when the robot does not walk on the planned shortest predicted path along the edge, the first preset inflection point set that meeting the guiding condition is selected from the preset navigation path. When the robot walks on the planned shortest predicted path along the edge, the second preset inflection point set that meeting the guiding condition is selected from the preset navigation path. Both the first preset inflection point set and the second preset inflection point set are composed of the inflection points on the navigation path that meet the guiding condition.

Optionally, the guiding condition is specifically expressed as: a target inflection point is selected from the navigation path, and then by whether the target inflection point and one or two inflection points consecutively set along a navigation forward direction of the navigation path from the target inflection point have the final navigation target point is determined, the first preset inflection point set that meeting the guiding condition or the second preset inflection point set that meeting the guiding condition is selected. The navigation forward direction of the navigation path is a robot navigation direction for guiding the robot to move to the final navigation target point. The final navigation target point is a termination point of the navigation path, and also belongs to one of the inflection points of the navigation path.

Optionally, when it is determined that neither of the two inflection points consecutively set along the navigation forward direction of the navigation path from the target inflection point is the final navigation target point, the first preset inflection point set that meeting the guiding condition or the second preset inflection point set that meeting the guiding condition is determined includes: the target inflection point, and two inflection points consecutively set along the navigation forward direction of the navigation path from the target inflection point on the navigation path; when it is determined that the first inflection point or the second inflection point consecutively set along the navigation forward direction of the navigation path from the target inflection point is the final navigation target point, the first preset inflection point set that meeting the guiding condition or the second preset inflection point set that meeting the guiding condition is determined includes: all of the inflection points that are arranged along the navigation forward direction of the navigation path from the target inflection point to the final navigation target point on the navigation path. The target inflection point and the final navigation target point are also included. The first inflection point is adjacent to the target inflection point in the navigation forward direction of the navigation path. The second inflection point is adjacent to the first inflection point in the navigation forward direction of the navigation path. When it is determined that the target inflection point selected on the navigation path is the final navigation target point, the first preset inflection point set that meeting the guiding condition or the second preset inflection point set that meeting the guiding condition has only the final navigation target point.

Optionally, a method for specifically selecting the target inflection point on the preset navigation path includes: an inflection point comparison region composed of grid coordinates that use the current position of the robot as a center and a maximum distance from the current position of the robot as a first preset distance threshold value is established, wherein, when the first preset inflection point set that meeting the guiding condition is selected from the preset navigation path, the current position of the robot is not on the planned shortest predicted path along the edge; when the second preset inflection point set that meeting the guiding condition is selected from the preset navigation path, the current position of the robot is on the planned shortest predicted path along the edge; when the inflection point comparison region only has one inflection point, the inflection point is selected and recorded as the target inflection point; when the inflection point comparison region has two or more than two inflection points, in the inflection points with distances from the current position of the robot being less than the first preset distance threshold value, the inflection point that is closest to the final navigation target point in the navigation forward direction of the navigation path is selected and recorded as the target inflection point; and when the inflection point comparison region has no inflection points, along the navigation forward direction of the navigation path, the inflection point that is adjacent to the target inflection point recently marked by the robot on the navigation path to record is selected as a new target inflection point. When a distance between the current position of the robot and one of the inflection points is less than a second preset distance threshold value, the current position of the robot is determined to coincide with the inflection point. The second preset distance threshold value is less than the first preset distance threshold value.

Optionally, the navigation path is formed by connecting a set of inflection points that are orderly distributed, and planned serial numbers of the inflection points arranged along the navigation forward direction of the navigation path increase sequentially. Planned serial numbers of the inflection points of the first preset inflection point set or the second preset inflection point set increase sequentially. The inflection points of which planned serial numbers are less than a planned serial number of the target inflection point in the corresponding inflection point set is recorded as the inflection points traversed by the robot. A planned serial number of the final navigation target point is the greatest, so as to cause the planned serial numbers corresponding to the inflection points that are closer to the final navigation target point in the navigation forward direction of the navigation path to be greater.

Optionally, a method for planning the predicted path along the edge configured to cause the robot to cross an obstacle includes the following steps. At step 1, a collision point is marked on a grid map with pre-marked obstacle information after the robot currently collides with the obstacle. At step 2, grids meeting an obstacle-crossing condition along the edge are selected on a neighborhood of the currently marked collision point, and the selected grids are recorded as behavior points along the edge for the robot walking along the edge of the obstacle, so as to cause the behavior points along the edge to form the two predicted path along the edge with opposite directions along the edge for the robot to cross the obstacle.

Optionally, a specific method of step 2 includes the following steps. At step 21, obstacle points of which distance relationship with the currently marked collision point meets a closest distance condition are searched. At step 22, the grids meeting a pre-condition along the edge are searched on a neighborhood of the obstacle points searched in step 21. At step 23, when the number of the grids meeting the pre-condition along the edge is counted to reach a second preset grid number, a grid meeting an optimal condition along the edge is selected from the grids meeting the pre-condition along the edge as the grids meeting the obstacle-crossing condition along the edge. At step 24, the grid meeting the optimal condition along the edge and selected in step 23 is recorded as a new collision point, the collision point is added as a newly planned behavior point along the edge on the corresponding predicted path along the edge for the robot walking along the edge of the obstacle, meanwhile, the new collision point is updated as the currently marked collision point, and then step 21 is performed again, until the behavior points along the edge of a preset obstacle-crossing grid number are marked. When the obstacle points meeting the closest distance condition are not searched out in step 21, it is determined that the predicted path along the edge is unable to be planned. Alternatively, when the grids meeting the pre-condition along the edge are not searched out in step 22, it is determined that the predicted path along the edge is unable to be planned.

Optionally, in step 23, the grid meeting the optimal condition along the edge includes: a grid that is closest to the edge of the obstacle from a connecting line of a center position of the robot is selected from the grids meeting the pre-condition along the edge. The center position of the robot maintains unchanged in a process of planning the predicted path along the edge.

Optionally, step 23 specifically includes: when the counting number of the grids meeting the pre-condition along the edge reaches a second preset grid number, the grid that is closest to the edge of the obstacle from the connecting line of the center position of the robot from the grids is selected according to a relative position relationship between the grids meeting the pre-condition along the edge and the center position of the robot, to meet the obstacle-crossing condition along the edge.

Optionally, a method for calculating the relative position relationship between the grids meeting the pre-condition along the edge and the center position of the robot includes: a robot coordinate system by using the center position of the robot as an original point, a right side direction of a body of the robot as an X-axis positive direction, and a current forward direction of the robot as a Y-axis positive direction is established; and on the robot coordinate system, a coordinate value and an angle value of each grid meeting the optimal condition along the edge relative to an original point of the robot coordinate system is calculated respectively.

Optionally, the collision point includes a front collision point, a left collision point, and a right collision point. A left collision detector is disposed at a left front portion of the body of the robot and configured to detect an obstacle collided on a left side of the forward direction of the robot, so as to detect the obstacle collided by the left side of the body when the robot walks along an edge anticlockwise along the edge of the obstacle, and mark a collision point on the obstacle in a corresponding direction as the left collision point. A right collision detector is disposed at a right front portion of the body of the robot and configured to detect an obstacle collided on a right side of the forward direction of the robot, so as to detect the obstacle collided by the right side of the body when the robot walks along an edge clockwise along the edge of the obstacle, and mark a collision point on the obstacle in the corresponding direction as the right collision point. The left collision detector and the right collision detector are symmetrically disposed on the left and right sides of the body of the robot. When a front side of the robot collides with the obstacle, the left collision detector and the right collision detector are simultaneously triggered for detection, and a collision point on the obstacle in a corresponding direction is marked as the front collision, so as to cause the front collision point, the left collision point, and the right collision point of the robot marked in a same position to be located on a tangent line of a contour line of the obstacle collided with the front side of the robot. The contour line of the obstacle is marked on the grid map.

Optionally, a method for selecting the grid that is closest to the edge of the obstacle from the connecting line of the center position of the robot from the grids according to the relative position relationship between the grids meeting the pre-condition along the edge and the center position of the robot includes: when the collision point currently marked in step 1 is the left collision point, a grid that meets the pre-condition along the edge, is distributed anticlockwise along the edge of the obstacle relative to the current position of the robot, and has a maximum angle value relative to the current position of the robot is selected as the grid meeting the optimal condition along the edge, so as to cause the grid meeting the optimal condition along the edge to be connected as the right predicted path along the edge, a reference direction of the robot along the edge is also determined to be an anticlockwise direction; and when the collision point currently marked in step 1 is the right collision point, a grid that meets the pre-condition along the edge and is distributed clockwise along the edge of the obstacle relative to the current position of the robot, and has a minimum angle value relative to the current position of the robot is selected as the grid meeting the optimal condition along the edge, so as to cause the grid meeting the optimal condition along the edge to be connected as the left predicted path along the edge, a reference direction of the robot along the edge is also determined to be a clockwise direction.

Optionally, in step 21, the obstacle point meeting the closest distance condition includes: searching an obstacle point that is closest to the collision point currently marked in step 1 in a first preset searching region and is not marked as the collision point. The first preset searching region is a grid region that is established by using the collision point currently marked in step 1 as a center and a maximum distance from the collision point currently marked in step 1 as a first preset grid number. Before step 24 is performed, the collision point currently marked in step 1 is a first collision point that is marked by the robot on the grid map with pre-marked obstacle points by performing step 1. After step 24 is performed, the collision point currently marked in step 1 is a new collision point that is marked by the robot in step 24 that is performed at the last time.

Optionally, between step 22 and step 23, the method further includes: when the grid meeting the pre-condition along the edge is counted, calculating the relative position relationship between the grid meeting the pre-condition along the edge and the center position of the robot. According to the technical solution, subsequent steps of screening the grids for guiding the robot to walk in a correct direction along the edge are accelerated.

Optionally, in step 22, the grid meeting the pre-condition along the edge includes: among 8 grids in a neighborhood of the obstacle points searched in step 21, selecting grids traversed and marked by the robot except for the obstacle points and the behavior points along the edge planned by step 24.

A method for controlling an obstacle-crossing for a robot includes: a robot is controlled to perform the foregoing obstacle-crossing termination determination method; when current obstacle crossing performed by the robot is determined to be terminated, the robot is controlled to stop walking along an edge according to a pre-selected shortest predicted path along the edge to end obstacle crossing; and when the current obstacle crossing performed by the robot is determined to not be terminated, the robot is controlled to continuously walk along the edge according to the pre-selected shortest predicted path along the edge to end obstacle crossing, and the obstacle-crossing termination determination method is performed simultaneously and continuously.

Optionally, the method further includes: after the robot stops walking along the edge according to the pre-selected shortest predicted path along the edge, the robot is controlled to walk according to a preset navigation path; after detecting that the robot collides with an obstacle, the shortest predicted path along the edge is planned and selected; and then the obstacle-crossing termination determination method is returned to perform, and so on, until the robot moves to a final navigation target point.

Optionally, in a process that the robot walks along the edge according to the pre-planned shortest predicted path along the edge, when a rotation angle and walking mileage of the robot along the edge within a preset time along the edge meet corresponding limiting conditions, the robot is controlled to continuously walk along the edge according to the shortest predicted path along the edge, otherwise the robot is controlled to stop walking along the edge according to the pre-selected shortest predicted path along the edge to end obstacle crossing.

A chip stores a program code. When the program code is performed by the chip, the foregoing obstacle-crossing termination determination method is implemented, or the foregoing obstacle-crossing control method is implemented.

A robot is provided. A left collision detector is disposed at a left front portion of the body of the robot and configured to detect an obstacle collided on a left side of the forward direction of the robot, so as to detect the obstacle collided by the left side of the body when the robot walks along an edge anticlockwise along the edge of the obstacle. A right collision detector is disposed at a right front portion of the body of the robot and configured to detect an obstacle collided on a right side of the forward direction of the robot, so as to detect the obstacle collided by the right side of the body when the robot walks along an edge clockwise along the edge of the obstacle. The robot is provided with the chip. The chip is connected to the left collision detector and the right collision detector. The robot is configured to perform the foregoing obstacle-crossing control method.

DETAILED DESCRIPTION OF THE EMBODIMENTS

Figure 1:
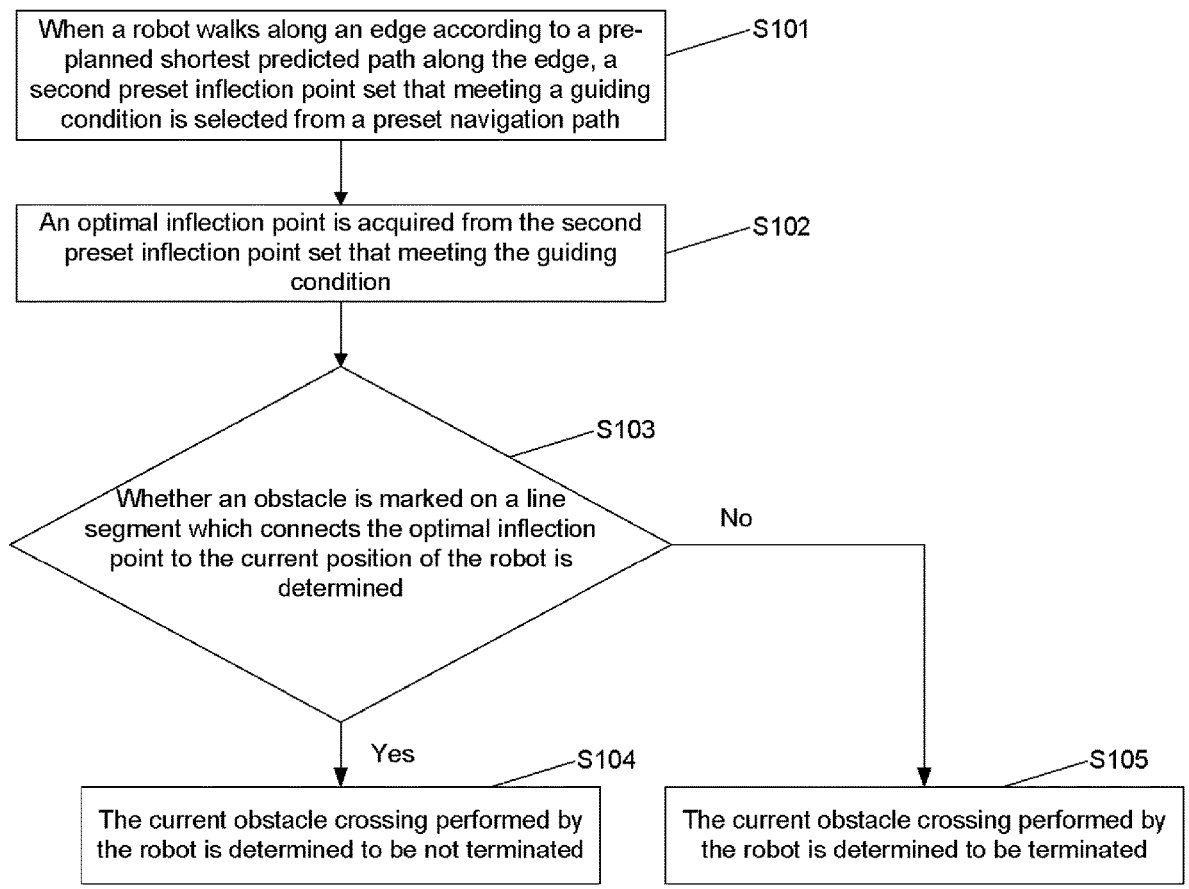
FIG. 1 is a flowchart of a basic conception of a method for determining a termination of an obstacle-crossing according to an embodiment of the present disclosure.

The technical solutions in embodiments of the present disclosure will be described in detail below with reference to the drawings in the embodiments of the present disclosure. In order to further describe the embodiments, the present disclosure provides the drawings. These drawings are a part of the disclosure of the present disclosure, which are mainly used for illustrating the embodiments, and can be used in conjunction with the relevant description of the specification to explain the operation principles of the embodiments. With reference to these contents, one of ordinary skill in the art shall understand other possible embodiments and advantages of the present disclosure. Components in the drawings are not drawn to scale, and similar component symbols are often used to represent similar components.

In the patent for the present disclosure, it is to be noted that, terms such as "up", "down", "left", "right", "front", "rear" and the like are orientation or position relationships shown in the drawings, are adopted not to indicate or imply that indicated devices or components must be in specific orientations or structured and operated in specific orientations but only to conveniently describe the present disclosure and simplify descriptions and thus should not be understood as limits to the patent for the present disclosure.

A robot can encounter different obstacles during the walking along an edge. In order to effectively simplify the description on indoor environments and put forward reasonable corresponding strategies during path planning, the following processing can be performed on an indoor obstacle. 1. As long as a distance between an obstacle and a wall does not meet a minimum distance that the robot passes through, and the robot cannot pass successfully, it is processed as a wall obstacle. 2. When a distance between two obstacles is very close and the robot cannot pass through, the two obstacles can be regarded as one obstacle for processing. 3. In the present disclosure, a robot navigation region is mainly an indoor room region, the obstacle is an object that can collide with a mobile robot in the indoor room region, and a point that the mobile robot collides with the object is defined as a collision point.

As shown in FIG. 1, an embodiment of the present disclosure discloses an obstacle-crossing termination determination method for a robot, including the following steps.

At step S101, when the robot walks along an edge according to a pre-planned shortest predicted path along the edge, a second preset inflection point set that meeting a guiding condition is selected from a preset navigation path, and then step S102 is performed. The navigation path is set before the robot starts navigation. The shortest predicted path along the edge is planned and selected when the robot collides with an obstacle during navigation, and acts as a planned obstacle-crossing path along the edge required for the robot to walk along the edge of the obstacle. In this way, the robot does not walk according to the navigation path after colliding with the obstacle, but starts a mode along the edge to cross the obstacle along the edge, so that the robot walks along the edge around the currently detected obstacle according to the shortest predicted path along the edge. The second preset inflection point set is composed of inflection points meeting the guiding condition on the navigation path.

At step S102, an optimal inflection point is acquired from the second preset inflection point set that meeting the guiding condition, so as to cause the optimal inflection point to be an inflection point that a distance between all of the inflection points of the second preset inflection point set that meeting the guiding condition and a current position of the robot is closest to an obstacle-crossing determination threshold value, and then step S103 is performed. The obstacle-crossing determination threshold value is preferably 6 grid lengths, and is used for filtering an inflection point that matches a distance from the current position of the robot in the second preset inflection point set, so that a connecting line between the optimal inflection point and the current position of the robot can pass through an effective region covered by the obstacle.

At step S103, whether the obstacle is marked on a line segment that connects the optimal inflection point and the current position of the robot is determined, in a case that the obstacle is marked on the line segment that connects the optimal inflection point and the current position of the robot, step S104 is performed, otherwise, step S105 is performed. Step S103 is actually to determine, on a grid map, whether an obstacle point is marked on the line segment from the current position of the robot to the optimal inflection point selected in step S102. The obstacle point is marked on the grid map in advance, and is used for matching and determining obstacle distribution conditions of a robot navigation environment later.

At step S104, current obstacle crossing performed by the robot is determined to be not terminated. That is to say, the line segment that connects the optimal inflection point determined in step S102 and the current position of the robot passes through the obstacle point, and there is still an obstacle in a direction of the current position of the robot pointing to the optimal inflection point, so that the current obstacle crossing performed by the robot is determined to be not terminated, which is still in a working state of obstacle crossing.

At step S105, the current obstacle crossing performed by the robot is determined to be terminated. That is to say, the line segment that connects the optimal inflection point determined in step S102 and the current position of the robot does not pass through the obstacle point, and there is no obstacle on the line segment of the current position of the robot and the optimal inflection point, so that the robot is determined to enter an obstacle-crossing termination state. Therefore, the robot has successfully crossed the obstacle. In this case, the robot is controlled to quit obstacle crossing along the edge and switches back to the navigation path to continuously advance to a termination point of the navigation path.

According to the foregoing steps, detection of whether the robot crosses the currently detected obstacle is accelerated, so that a determination condition of the obstacle-crossing termination state is provided for the obstacle crossing of the robot along the edge. Therefore, a working state that the robot crosses the obstacle is timely prompted, and conditions of the obstacle-crossing path along the edge and the navigation path of the robot is timely and automatically adjusted. In this way, the robot is prevented from walking around the obstacle endlessly, and the robot can timely switch back to the navigation path after crossing the obstacle, thereby enhancing the navigation efficiency of the robot.

Figure 2:
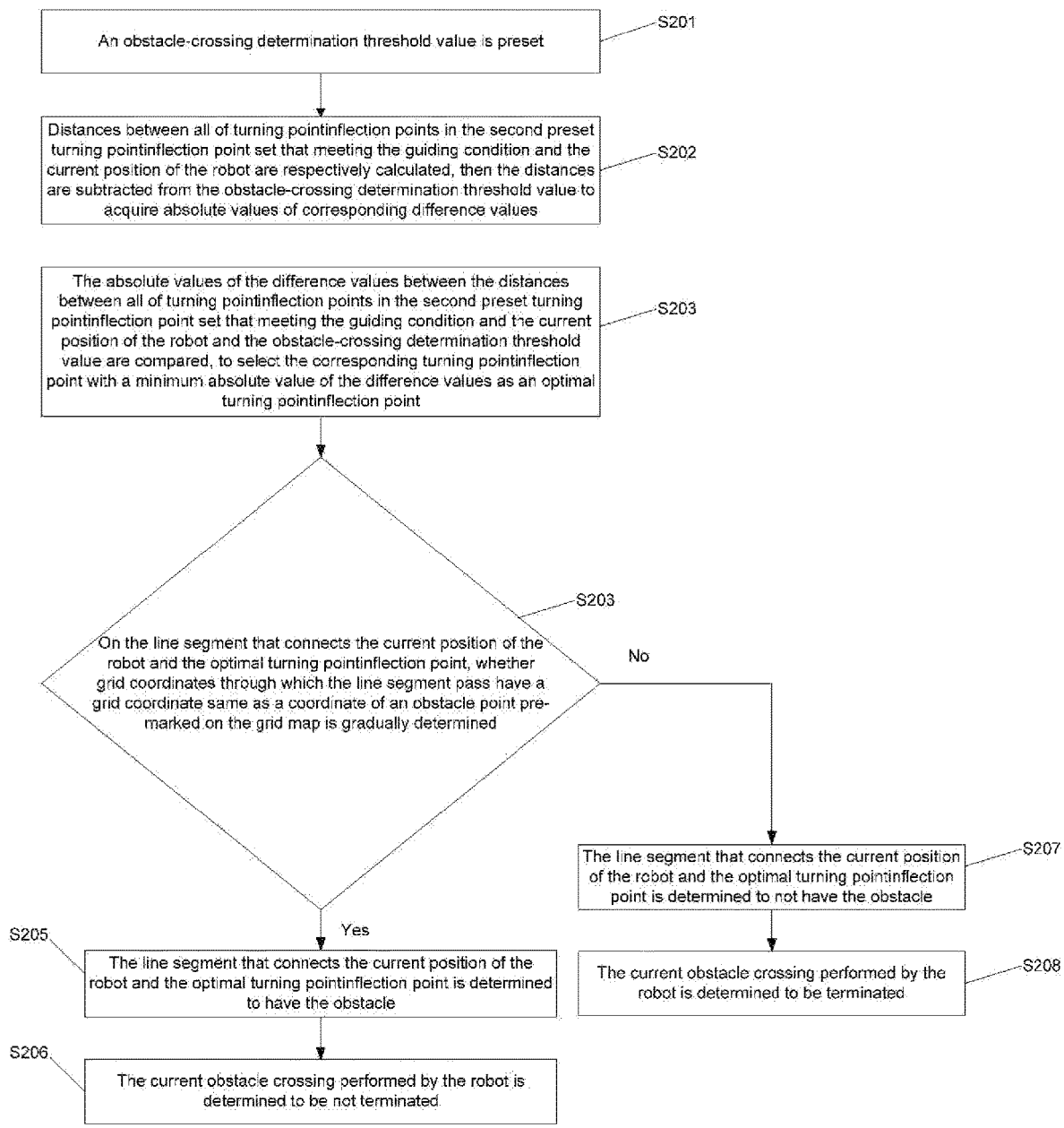
FIG. 2 is a flowchart of specific steps of a method for determining a termination of an obstacle-crossing according to another embodiment of the present disclosure.

As an embodiment, as shown in FIG. 2, the present disclosure further discloses an obstacle-crossing termination determination method for a robot, specifically including the following steps.

At step S201, the robot preset an obstacle-crossing determination threshold value, and then step S202 is performed. The obstacle-crossing determination threshold value is preferably 6 grid lengths, and is used for screening a line segment with a reasonable length and for obstacle determination.

At step S202, a distance between each inflection point in the second preset inflection point set that meeting the guiding condition and the current position of the robot is calculated, then the distances are subtracted from the obstacle-crossing determination threshold value to acquire absolute values of corresponding difference values, and then step S203 is performed. Step S202 is used for calculating a length of the connecting line between each inflection point in the second preset inflection point set and the current position of the robot, and acquiring the degree of a difference between the length of the connecting line corresponding to each inflection point and a numerical value of the obstacle-crossing determination threshold value.

At step S203, absolute values of the difference values between the distance between each inflection point in the second preset inflection point set that meeting the guiding condition and the current position of the robot and the obstacle-crossing determination threshold value are compared, the inflection point corresponding to the minimum absolute value of the difference values is selected as the optimal inflection point, so as to cause the optimal inflection point to be the inflection point that the distance between all of the inflection points of the second preset inflection point set that meeting the guiding condition and the current position of the robot is closest to the obstacle-crossing determination threshold value, and then step S204 is performed. Therefore, whether the robot has crossed the obstacle at the current position can be determined more accurately.

At step S204, on the line segment that connects the current position of the robot and the optimal inflection point, whether grid coordinates passed by the line segment have a same grid coordinate as a coordinate of an obstacle point pre-marked on the grid map is traversed and determined one by one, in a case that the grid coordinates passed by the line segment have the same grid coordinate as the coordinate of the obstacle point pre-marked on a grid map, step S205 is performed, otherwise step S207 is performed. Step S204 needs to obtain a line segment equation using two coordinate points as endpoints on the basis of acquiring coordinates of the current position of the robot and the optimal inflection point. Then, a grid coordinate through which the line segment passes is calculated. The coordinate points on the calculated line segment are respectively mated and compared with a coordinate of the pre-marked obstacle point, so that whether there is an obstacle point in a grid through which the line segment passes can be determined.

At step S205, as long as there is a coordinate point on the line segment of step S204 successfully matching the coordinate of the obstacle point, the grid through which the line segment passes is determined to have the obstacle point, the line segment that connects the current position of the robot and the optimal inflection point is determined to have the obstacle or pass through the obstacle, and then step S206 is performed.

At step S206, the current obstacle crossing performed by the robot is determined to be not terminate, that is, the robot is determined to still need to be in an obstacle-crossing working state. The robot subsequently walks along the edge along the pre-planned shortest predicted path along the edge. Step S202 to step S205 are repeated to continuously determine whether the robot enters a working state of obstacle-crossing termination during the walking along the edge on the shortest predicted path along the edge, that is, whether the robot has successfully crossed the obstacle is determined.

At step S207, if there is no coordinate point on the line segment of step S204 successfully matching the coordinate of the obstacle point, the line segment is determined to not pass through the obstacle point, so as to determine that the line segment that connects the current position of the robot and the optimal inflection point has no obstacle or does not pass through the obstacle, and then step S208 is performed.

At step S208, the current obstacle crossing performed by the robot is determined to be terminated. That is to say, the robot is determined to successfully cross the current obstacle to enter the working state of obstacle-crossing termination. The robot does not continuously walk along the edge along the pre-planned shortest predicted path along the edge but shifts to the navigation path to move to the termination point of the navigation path. During the navigation of the robot, if a new obstacle is collided, the shortest predicted path along the edge is planned and selected. Then step S202 to step S205 are repeated to continuously determine whether the robot enters a working state of obstacle-crossing termination during the walking along the edge on the shortest predicted path along the edge, that is, whether the robot has successfully crossed the obstacle is determined.

The foregoing steps are used for determining whether there is an obstacle in a direction of the current position of the robot pointing to an optimal inflection point of the navigation path, if no, it means that there are fewer obstacles detected by the robot during follow-up navigation, so that obstacle-crossing time for accelerating navigation can be provided for the robot, that is, the time of the obstacle-crossing termination state automatically determined for the robot based on the obstacle-crossing termination determination method.

Based on the foregoing embodiments, within preset time along the edge, whether a rotation angle and a walking mileage of the robot along the edge meet corresponding limiting conditions is determined during a process of the robot walking along the edge according to the pre-planned shortest predicted path along the edge, in a case that the rotation angle and the walking mileage of the robot along the edge within the preset time along the edge meet corresponding limiting conditions during the process of the robot walking along the edge according to the pre-planned shortest predicted path along the edge, the robot is determined to not be trapped in a same position and have an obstacle-crossing condition, so that the current obstacle crossing performed by the robot is determined to be not terminated and obstacle crossing along the edge is required to be continuously performed according to the pre-planned shortest predicted path along the edge, otherwise, the robot is determined to be trapped in the same position and need to give up the obstacle-crossing operation along the edge in advance, so that the current obstacle crossing performed by the robot is determined to be terminated. In this embodiment, whether the robot moves back and forth in a same place for a long-time during obstacle crossing along the edge is monitored, if so, the navigation is determined to not work at this time, and then the shortest predicted path along the edge planned at this time is given up. In this embodiment, a condition under which the robot can continue to navigate by crossing the obstacle is disclosed, which is facilitated to end an abnormal state of the robot being trapped in advance.

Preferably, the method for determining, within preset time along the edge, the rotation angle and the walking mileage of the robot along the edge meet the corresponding limiting conditions during the process of the robot walking along the edge according to the pre-planned shortest predicted path along the edge, in a case that the rotation angle and the walking mileage of the robot along the edge within the preset time along the edge meet corresponding limiting conditions during the process of the robot walking along the edge according to the pre-planned shortest predicted path along the edge, the robot is not trapped in the same position is determined, otherwise, the robot is trapped in the same position is determined specifically includes: when the time for timing the robot walking along the edge reaches the preset time along the edge (preferably 30 seconds), the robot is not trapped in the same position is determined, and the current obstacle crossing performed by the robot is determined to be not terminated, if the rotation angle of the robot along the edge is determined to be less than or equal to a preset maximum rotation angle (preferably 360 degrees) and the walking mileage of the robot along the edge is determined to be less than or equal to a preset maximum distance along the edge (preferably 1 meter); and when the time for timing the robot walking along the edge reaches the preset time along the edge (preferably 30 seconds), the robot is trapped in the same position is determined to rotate repeatedly if the rotation angle of the robot along the edge is determined to be greater than the preset maximum rotation angle (preferably 360 degrees) and the walking mileage of the robot along the edge is determined to be greater than the preset maximum distance along the edge (preferably 1 meter), so as to prevent the robot from deviating too far from the navigation path because the robot walks along the edge for a long time and determine that the current obstacle crossing performed by the robot is terminated. In this way, according to this embodiment, whether the robot is trapped is determined by using time along the edge, a distance along the edge, and an angle along the edge that are collected when the robot crosses the obstacle along the edge, so that the state that the obstacle crossing performed by the robot is terminated can be announced in advance. The preset time along the edge is the longest time along the edge in a process that the robot crosses the obstacle along the edge according to the pre-planned shortest predicted path along the edge. The preset maximum rotation angle is the maximum robot accumulated rotation angle in the process that the robot crosses the obstacle along the edge according to the pre-planned shortest predicted path along the edge. The preset maximum distance along the edge is the maximum actual path length along the edge in the process that the robot crosses the obstacle along the edge according to the pre-planned shortest predicted path along the edge.

The rotation angle of the robot along the edge is a result of accumulating angle increments of a gyroscope that is regularly read by the robot. The operation specifically includes as follows. The robot reads an angle currently measured by a gyroscope every 10 ms, subtracts an angle read last time (before 10 ms) from the angle to obtain an angle difference measured by the gyroscope within 10 ms, and then repeats the foregoing steps within a period of time along the edge to accumulate the angle difference within 10 ms, so that the rotation angle along the edge of the robot within the period of time along the edge is obtained in a manner equivalent to integral summation.

Based on the foregoing embodiments, a method for planning the shortest predicted path along the edge includes the following steps.

At step S301, the robot is preset with the navigation connected by the inflection points, the inflection points are used for guiding the robot to move to a final navigation target point, and then step S302 is performed. The final navigation target point is the termination point of the navigation path, which is one of the inflection points of the navigation path. It is to be noted that, the navigation path has calculated before the robot walks, and is formed by connecting a plurality of line segments in the grid map. The line segments intersect at the inflection points, so that the navigation path of the grid map can be described by using the inflection points. Therefore, during the advancing of the robot along the navigation path, the robot starts to traverse the next inflection point in the same navigation path from the current inflection point toward a navigation direction, until the robot advances to the final navigation target point.

At step S302, after the robot collides with the obstacle, a predicted path along the edge for the obstacle crossing of the robot is planned, a first preset inflection point set that meeting the guiding condition is selected from the preset navigation path, and then step S303 is performed. The predicted path along the edge for the obstacle crossing of the robot includes two predicted paths along the edge with opposite directions along the edge, which respectively are a left predicted path along the edge and a right predicted path along the edge. Since a mode that the robot walks along the edge of the obstacle is classified into a left mode along the edge and a right mode along the edge, the robot under the left mode along the edge moves clockwise along the edge of the obstacle, and the robot under the right mode along the edge moves anticlockwise along the edge of the obstacle, after the robot starts walking along the edge, two predicted paths along the edge configured to cause the robot to cross an obstacle and having opposite directions along the edge are planned.

At step S303, according to distance information between all of behavior points along the edge on each predicted path along the edge and the inflection points of the first preset inflection point set that meeting the guiding condition on the same navigation path, the predicted path along the edge with a minimum deviation from the navigation path is selected as the shortest predicted path along the edge, so as to cause the robot to walk along the edge according to the shortest predicted path along the edge after colliding with the obstacle to achieve rapid obstacle crossing. In this embodiment, the preset navigation path has is not related to the distribution of the obstacle. The inflection points of the first preset inflection point set of the navigation path are path nodes set by using the final navigation target point as the termination point, which are also a type of the inflection points. The first preset inflection point sets meeting the guiding conditions are used as reference quantity, and are used for determining and selecting the predicted path along the edge with the minimum deviation from the navigation path from candidate predicted paths along the edge that are planned in step S302. Then, the robot is controlled to walk according to the selected predicted path along the edge after colliding with the obstacle. However, a path along the edge that the robot actually walks is not necessarily performed according to a predicted plan. After all, there is a certain error in the predicted and planned path, and it can only show an approximate path and clarify a reasonable and feasible direction along the edge, for example, the robot walks clockwise or anticlockwise along the edge of the obstacle. Therefore, in this embodiment, after the robot collides with the obstacle, the robot can walk in the direction along the edge according to the shortest predicted path along the edge to achieve rapid obstacle crossing along the edge.

In this embodiment, the predicted path along the edge with the minimum deviation from the navigation path is selected based on the foregoing steps as the shortest predicted path along the edge, so that, after colliding with the obstacle, the robot can walk according to the direction along the edge of the selected predicted path along the edge to implement rapid obstacle crossing, the number of collisions of the robot during obstacle crossing is reduced, and the robot is prevented from deviating too far from the navigation path or the final navigation target point. Therefore, an efficient obstacle-crossing function of the robot along the edge can be realized, and the intelligence level of the robot can be improved.

In the foregoing embodiment, when the robot does not walk on the planned shortest predicted path along the edge, the following two situations can occur. In a case that the robot has planned a shortest predicted path along the edge, since the robot uses the obstacle-crossing termination determination method in the foregoing embodiment to determine that the robot enters the obstacle-crossing termination state on the shortest predicted path along the edge, or determine that obstacle crossing fails because the robot is trapped in the same position on the shortest predicted path along the edge for a long time, the robot does not continuously walk along the edge on the shortest predicted path along the edge, but enters the navigation path. When a new shortest predicted path along the edge is required to be planned, the first preset inflection point set that meeting the guiding condition is selected from the preset navigation path. When the robot starts navigation, and in a case that the shortest predicted path along the edge has not yet been planned, the robot keeps walking along the navigation path. When the robot needs to cross the obstacle, the first preset inflection point set that meeting the guiding condition is selected from the preset navigation path. When the robot walks along the edge on the planned shortest predicted path along the edge, a second preset inflection point set that meeting the guiding condition is selected from the preset navigation path. Both the first preset inflection point set and the second preset inflection point set are composed of the inflection points on the navigation path that meet the guiding condition. Therefore, the utilization of an algorithm for selecting preset inflection points meeting the guiding condition can be increased.

As a preferred embodiment, all of the inflection points on the navigation path are numbered. A planned serial number of an initial point of the navigation path is 0. The following planned serial numbers increase sequentially. A planned serial number of the termination point of the navigation path remains the maximum. Specifically, the navigation path is formed by connecting a set of inflection points that are orderly distributed. In a navigation forward direction of the navigation path corresponding to the initial point of the navigation point to the termination point, the planned serial numbers of the inflection points arranged on the navigation path increase sequentially. Planned serial numbers of the inflection points of the first preset inflection point set or the second preset inflection point set that meeting the guiding condition increase sequentially. The inflection points of which planned serial numbers are less than a planned serial number of the target inflection point in the corresponding inflection point set are recorded as the inflection points traversed by the robot. Since the planned serial number of the final navigation target point is the greatest, the planned serial numbers corresponding to the inflection points that are closer to the final navigation target point in the navigation forward direction of the navigation path are greater. In this embodiment, all of the inflection points on the navigation path are sorted and distinguished by means of numbering, so that system software can conveniently identify and process the inflection points. Therefore, the selection of the first preset inflection point set or the second preset inflection point set that meeting the guiding condition can be accelerated, and the speed of the robot to select the direction along the edge can be improved.

As s preferred embodiment, in step S302, a method for selecting the first preset inflection point set that meeting the guiding condition or the second preset inflection point set that meeting the guiding condition from the preset navigation path includes: a target inflection point is selected from the navigation path. The target inflection point is an inflection point that has a guide effect and is selected by the robot in a current position. When the robot selects the first preset inflection point set that meeting the guiding condition, the current position is an initial position that the robot collides with the obstacle and starts obstacle crossing along the edge. When the robot selects the second preset inflection point set that meeting the guiding condition, the current position is used for searching the optimal inflection point to determine whether obstacle crossing is terminated. When the current position of the robot is refreshed and changed, the target inflection point is also changed.

Generally, the guiding condition is expressed as the following: by whether the target inflection point and one or two inflection points consecutively set along the navigation forward direction of the navigation path have the final navigation target point is determined, the first preset inflection point set that meeting the guiding condition or the second preset inflection point set that meeting the guiding condition is selected. It is to be noted that, when the adjacent inflection points arranged along the navigation forward direction of the navigation path from the target inflection point is the final navigation target point, the termination point of the navigation path has been determined, so that continuous determination is not needed. The navigation forward direction of the navigation path is a robot navigation direction for guiding the robot to move to the final navigation target point. The final navigation target point is a termination point of the navigation path, and also belongs to one of the inflection points of the navigation path. In this embodiment, by determining whether three inflection points consecutively set on the navigation path have a termination point of the navigation path, the representative inflection point that can guide the robot to move to the final navigation target point is screened, and the difference between the navigation path and the predicted path along the edge can further be compared.

With regard to a method for generally selecting the first preset inflection point set that meeting the guiding condition and the second preset inflection point set that meeting the guiding condition, this embodiment discloses the following steps. When it is determined that neither of the two inflection points consecutively set along the navigation forward direction of the navigation path from the target inflection point is the final navigation target point, the first preset inflection point set that meeting the guiding condition or the second preset inflection point set that meeting the guiding condition is determined includes: a target inflection point selected from the navigation path, and two inflection points consecutively set along the navigation forward direction of the navigation path from the target inflection point. The two inflection points that are consecutively set behind the target inflection point on the navigation path are arranged continuously. The planned serial numbers of the inflection points are sequentially increased and are greater than the planned serial number of the target inflection point. The target inflection point and the followed two inflection points are in front of the current position of the robot, so that an effect of guiding the robot to rapidly move to the final navigation target point can be achieved.

When the inflection point that is adjacent to the target inflection point and arranged along the navigation forward direction of the navigation path from the target inflection point is determined to be the final navigation target point, that is, when the first inflection point consecutively arranged along the navigation forward direction of the navigation path from the target inflection point is determined to be the final navigation target point, the first preset inflection point set that meeting the guiding condition or the second preset inflection point set that meeting the guiding condition is determined to include: all of the inflection points that are arranged along the navigation forward direction of the navigation path from the target inflection point to the final navigation target point on the navigation path. In this case, all of the inflection points that are arranged along the navigation forward direction of the navigation path from the target inflection point to the final navigation target point only have the target inflection point and the final navigation target point. In this case, from the target inflection point, there is only the first inflection point arranged in the navigation forward direction of the navigation path, without the arranged second inflection point, because the first inflection point has been determined as the termination point.

When the second inflection point consecutively arranged along the navigation forward direction of the navigation path from the target inflection point is determined to be the final navigation target point, the first preset inflection point set that meeting the guiding condition or the second preset inflection point set that meeting the guiding condition is determined to include: all of the inflection points that are arranged along the navigation forward direction of the navigation path from the target inflection point to the final navigation target point on the navigation path. In this case, there are three inflection points that are arranged along the navigation forward direction of the navigation path from the target inflection point to the final navigation target point, including the target inflection point, the final navigation target point, and an inflection point between the target inflection point and the final navigation target point on the navigation path. It is to be noted that, the first inflection point is arranged adjacent to the target inflection point in the navigation forward direction of the navigation path. The second inflection point is also arranged adjacent to the first inflection point in the navigation forward direction of the navigation path.

When the target inflection point selected on the navigation path is determined to be the final navigation target point, the first preset inflection point set that meeting the guiding condition or the second preset inflection point set that meeting the guiding condition is only the final navigation target point.

In conclusion, according to a determination result, both the first preset inflection point set that meeting the guiding condition or the second preset inflection point set that meeting the guiding condition disclosed by this embodiment can represent navigation direction features of the navigation path, and influencing factors of the termination point of the navigation path are fully considered, so that a subsequent calculated quantity of the difference between the predicted path along the edge and the navigation path can be simplified.

Based on the above preferred embodiment, a method for specifically selecting the target inflection point on the preset navigation path includes the following operations.

An inflection point comparison region composed of grid coordinates that use the current position of the robot as a center and a maximum distance from the current position of the robot as a first preset distance threshold value is established. When the first preset inflection point set that meeting the guiding condition is selected from the preset navigation path, the current position of the robot is not on the planned shortest predicted path along the edge. When the second preset inflection point set that meeting the guiding condition is selected from the preset navigation path, the current position of the robot is on the planned shortest predicted path along the edge.

When the inflection point comparison region only has one inflection point, the inflection point is selected and recorded as the target inflection point. In this way, a distance between the target inflection point and the current position of the robot is shortened, so that the subsequently selected predicted path along the edge is prevented from deviating too far from the navigation path or the final navigation target point. It is to be noted that, all of the inflection points of which planned serial numbers are less than the planned serial number of the target inflection point are designed as the inflection points that has been traversed by the robot.

When the inflection point comparison region has two or more than two inflection points, in the inflection points with distances from the current position of the robot being less than the first preset distance threshold value, that is, in the inflection points of partial path of the navigation path that is covered by the inflection point comparison region, the inflection point that is closest to the final navigation target point is selected and recorded as the target inflection point along the navigation forward direction of the navigation path. That is to say, the inflection point with the maximum planned serial number is selected as the target inflection point in front of the robot from the inflection points with distances from the current position of the robot being less than the first preset distance threshold value, so that the navigation speed to the final navigation target point is accelerated when the robot advances toward the target inflection point. It is to be noted that, all of the inflection points of which planned serial numbers are less than the planned serial number of the target inflection point are designed as the inflection points that has been traversed by the robot.

When the inflection point comparison region has no inflection points, along the navigation forward direction of the navigation path, the inflection point that is adjacent to the target inflection point recently marked by the robot on the navigation path is selected and recorded as a new target inflection point. The target inflection point recently marked by the robot is a target inflection point that is selected and marked from the navigation path in a position that the robot collides with the obstacle at the last time. In this way, a marking position of the target inflection point plays a fundamental role in controlling the navigation of the robot to the termination point. Therefore, the robot is guided to move in a correct direction along the edge, and the subsequently selected predicted path along the edge is prevented from deviating too far from the navigation path or the final navigation target point. Therefore, in this embodiment, the selected target inflection point has the function of guiding the robot to move in the direction of the termination point of the navigation path in a local navigation region.

Preferably, when a distance between the current position of the robot and one of the inflection points is less than a second preset distance threshold value, the current position of the robot is determined to coincide with the inflection point, which indicates that the robot has moved to a node position corresponding to the navigation path where the inflection point is located. The second preset distance threshold value is less than the first preset distance threshold value.

As another embodiment of the present disclosure, a method for planning the shortest predicted path along the edge specifically includes the following steps.

The robot is started. In this case, a robot system is powered on and started, and then step S401 is performed.

At step S401, the robot pre-calculated and set the navigation path formed by connecting the inflection points that are configured to guide the robot to move to the final navigation target point, and then the robot is controlled to start to walk according to the navigation path. In this embodiment, an initial direction along the edge of the robot is defaulted as a right direction along the edge. That is to say, after the robot collides with the obstacle in a default state, the robot can walk clockwise along the edge around the obstacle. Then step S402 is performed.

At step S402, whether a variation of a coordinate position where the robot is located is greater than a distance stabilization threshold value is determined within preset time, in a case that the variation of the coordinate position where the robot is located is greater than the distance stabilization threshold value is determined within preset time, step S403 is performed, otherwise, step S404 is performed. Step S402 is used for determining whether continuous and repeated walking along the edge occur at a same place during robot navigation or obstacle crossing along the edge. The distance stabilization threshold value is set to a diameter of a body of the robot.

At step S403, the robot is controlled to plan two predicted paths along the edge configured to cause the robot to cross an obstacle and having opposite directions along the edge, which are the two predicted paths along the edge before and after planning. Then step S205 is performed. In this embodiment, when the robot collides with a front obstacle, the edge of the obstacle is divided into a left side edge and a right-side edge relative to the forward direction of the robot, so that a mode that the robot walks along the edge of the obstacle is classified into a left mode along the edge and a right mode along the edge. The robot under the left mode along the edge moves clockwise along the edge of the obstacle. The robot under the right mode along the edge moves anticlockwise along the edge of the obstacle. Therefore, the two predicted paths along the edge configured to cause the robot to cross an obstacle and having opposite directions along the edge respectively are a left predicted path along the edge and a right predicted path along the edge.

At step S404, the robot can be determined to be in a trapped state due to a plurality of collisions to the obstacle, the robot needs to be controlled to change the direction along the edge, so as to cause the robot to walk along a direction opposite to the currently determined direction along the edge. Specifically, when the variation of the coordinate position where the robot is located is determined to be less than or equal to the distance stabilization threshold value within preset time, it indicates that the robot can collide with the obstacle during movement according to the navigation path, and then repeatedly walks along the edge around the obstacle at the current position. Alternatively, obstacle crossing can fail due to the collision to the obstacle when the robot walks around the obstacle according to the predicted path along the edge planned at the last time. Therefore, the robot needs to be controlled to change the direction along the edge, and selects the direction opposite to the direction along the edge during collision. For example, the currently performed left mode along the edge is changed to the right mode along the edge. Alternatively, the currently performed right mode along the edge is changed to the left mode along the edge. In this way, the robot can walk along the direction opposite to the currently determined direction along the edge, and continuously performs obstacle-crossing walking by selecting a corrected direction along the edge. In this way, the robot is prevented from being trapped in the same position due to failed obstacle crossing along the edge. The robot is further prevented from doing an invalid obstacle crossing behavior along the edge because the predicted path along the edge cannot be planned, to cause the robot to walk farther and farther along a wrong direction along the edge.

It is to be noted that, during robot navigation, the robot first starts to walk along the edge by selecting the edge of the obstacle through collision. However, obstacle-crossing failure easily occurs due to the lack of correct direction along the edge, which causes the robot to walk along the edge farther and farther. Therefore, the robot is required to be controlled to perform step S403 and step S404 to accelerate obstacle crossing.

At step S405, whether the robot plans the two predicted paths along the edge configured to cause the robot to cross an obstacle and having opposite directions along the edge is determined, if so, step S406 is performed, otherwise, step S404 is performed. Step S405 is used for determining whether the robot calculates the correct direction along the edge, to plan the predicted path along the edge that obstacle crossing is effectively performed by the robot. In this embodiment, the two predicted paths along the edge configured to cause the robot to cross an obstacle and having opposite directions along the edge respectively are the left predicted path along the edge and the right predicted path along the edge.

At step S406, distances between the first preset inflection point set of the navigation path meeting the guiding condition and a same behavior point along the edge on the left predicted path along the edge are calculated, and the distances between the behavior point along the edge and all of the first preset inflection point set on the navigation path meeting the guiding condition are added to a sum, to obtain a left local distance sum generated by the behavior point along the edge relative to the first preset inflection point set that meeting the guiding condition. The left predicted path along the edge is formed by connecting the behavior points along the edge. In addition, distances between the first preset inflection point set of the navigation path meeting the guiding condition and a same behavior point along the edge on the right predicted path along the edge are calculated, and then the distances between the behavior point along the edge and all of the first preset inflection point set on the navigation path meeting the guiding condition are added to a sum, to obtain a right local distance sum generated by the behavior point along the edge relative to the first preset inflection point set that meeting the guiding condition. The right predicted path along the edge is formed by connecting the behavior points along the edge. Then, step S407 is performed.

At step S407, the foregoing step S406 is repeatedly performed to obtain a left local distance sum generated by each behavior point along the edge relative to the first preset inflection point set that meeting the guiding condition; meanwhile, the foregoing step S406 is repeatedly performed to obtain a right local distance sum generated by each behavior point along the edge relative to the first preset inflection point set that meeting the guiding condition; and then, step S408 is performed.

At step S408, the left local distance sums are added together, to acquire a total sum of left distances generated by the left predicted path along the edge relative to the first preset inflection point set that meeting the guiding condition, for indicating the degree of deviation of the left predicted path along the edge relative to the navigation path; and meanwhile, the right local distance sums are added together, to acquire a total sum of right distances generated by the right predicted path along the edge relative to the first preset inflection point set that meeting the guiding condition, for indicating the degree of deviation of the right predicted path along the edge relative to the navigation path. Then step S409 is performed.

At step S409, whether the total sum of left distances is greater than the total sum of right distances is determined, if so step S410 is performed, otherwise, step S411 is performed. The smaller the total sum of right distances, the smaller the deviation of the right predicted path along the edge from the navigation path. The smaller the total sum of left distances, the smaller the deviation of the left predicted path along the edge from the navigation path.

At step S410, the right predicted path along the edge is selected as the shortest predicted path along the edge, so as to cause the robot to walk according to the direction along the edge of the right predicted path along the edge after colliding with the obstacle to achieve rapid obstacle crossing. That is to say, when the total sum of left distances is greater than the total sum of right distances, the right predicted path along the edge is determined to be the predicted path along the edge with the minimum deviation from the navigation path, the right predicted path along the edge planned in step S403 is selected, so that the robot to walk according to the direction along the edge of the right predicted path along the edge after colliding with the obstacle to achieve rapid obstacle crossing.

At step S411, the left predicted path along the edge is selected as the shortest predicted path along the edge, so as to cause the robot to walk according to the direction along the edge of the left predicted path along the edge after colliding with the obstacle to achieve rapid obstacle crossing. That is to say, when the total sum of right distances is greater than the total sum of left distances, the left predicted path along the edge is determined to be the predicted path along the edge with the minimum deviation from the navigation path, the left predicted path along the edge planned in step S403 is selected, so that the robot to walk according to the direction along the edge of the left predicted path along the edge after colliding with the obstacle to achieve rapid obstacle crossing.

During the performing of step S404, S410, and S411, the robot has walked along the edge, and walks along the edge of the obstacle. When an obstacle-crossing operation along the edge is performed, a position of the robot has been changed, so that it is required to update the current position of the robot in real time. Then step S402 is performed again, to continuously determine whether obstacle crossing fails during the walking of the robot along the edge.

According to the embodiment described in step S401 to step S411, by comparing a distance difference between the behavior point along the edge of the predicted path along the edge and a specific path node (the target inflection point and the inflection point arranged behind the target inflection point) in the navigation path, a difference between the predicted path along the edge and the navigation path is determined. Then, a direction along the edge corresponding to the predicted path along the edge with a small difference is selected as an optimal direction that the robot crosses the obstacle along the edge. In this way, the robot is prevented from excessively deviating from a preset navigation target (that is, the final navigation target point of the navigation path) during obstacle crossing.

In the foregoing embodiment, a method for planning the predicted path along the edge configured to cause the robot to cross an obstacle includes the following steps.

At step S4031, after the robot collides with the obstacle, or after the robot collides with the obstacle in a current navigation position, a collision point is marked on a grid map with pre-marked obstacle information, and then step S4032 is performed. When step S4031 is performed currently, the current marked collision point is to mark a grid corresponding to the obstacle on the map currently collided as the collision point. In this embodiment of the present disclosure, a plurality of collision detectors can be arranged on the robot that walks along the edge. A certain collision strength value can be preset. Whether collision between the robot and the obstacle occurs can be determined when a collision strength of the collision detectors is greater than a threshold. Herein, the distinguishing on detection data of a plurality of detectors can be realized by means of the threshold. In this embodiment, when the robot detects the obstacle, the grid coordinate where the obstacle is located is calculated, and the grid corresponding to the obstacle on the map is marked as the obstacle point.

At step S4032, on a neighborhood of the collision point currently marked in step S4031, grids meeting an obstacle-crossing condition along the edge are selected, and the selected grids are marked as newly planned behavior points along the edge on the predicted path along the edge for the robot to walk along the edge of the obstacle. That is to say, the grids meeting the obstacle-crossing condition along the edge form a component of the planned predicted path along the edge after the robot collides with the obstacle. The behavior points along the edge form the two predicted paths along the edge configured to cause the robot to cross an obstacle and having opposite directions along the edge, including the left predicted path along the edge under a left robot start mode along the edge and a right robot start mode along the edge. The robot under the left mode along the edge moves clockwise along the edge of the obstacle. The robot under the right mode along the edge moves anticlockwise along the edge of the obstacle. In this way, when the robot starts walking along the edge, the two predicted paths along the edge configured to cause the robot to cross an obstacle and having opposite directions along the edge are planned. Therefore, in this embodiment, after the robot detects the collision of the obstacle, and before the robot starts walking along the edge, the grids having the obstacle-crossing condition along the edge are searched by means of the neighborhood of the currently marked collision point, so that the robot can walk along the edge according to an obstacle-crossing path planned by the corresponding grids. In this way, the number of collisions of the robot is reduced, and navigation is accelerated to cross the obstacle.

As an embodiment of the present disclosure, a specific method of step S4032 includes the following steps. At step 21, the obstacle point of which distance relationship with the collision point currently marked in step S4031 meets a closest distance condition is searched, the collision point currently marked in step S4031 is the collision point marked on the grid map in step S4031 of the foregoing embodiment, and then step 22 is performed. At step 22, the grids meeting a pre-condition along the edge are selected on the neighborhood of the obstacle point searched in step 21, and then step 23 is performed. The neighborhood of the obstacle point is 8 grids surrounding the obstacle point. At step 23, when the number of the grids meeting the pre-condition along the edge is counted to reach a second preset grid number, a grid meeting an optimal condition along the edge is selected from the grids meeting the pre-condition along the edge as the grid meeting the obstacle-crossing condition along the edge, and then step 24 is performed. The grid meeting the obstacle-crossing condition along the edge is established based on the obstacle point meeting a closest distance condition and the grid meeting the optimal condition along the edge. That is to say, whether the grid meets the closest distance condition is determined first, and then whether correspondingly selected grid meets the optimal condition along the edge is determined based on this. At step 24, the grid meeting the optimal condition along the edge and selected in step 23 is recorded as a new collision point, the collision point is added as a newly planned behavior point along the edge on the corresponding predicted path along the edge for the robot walking along the edge of the obstacle, meanwhile, the new collision point is updated as the collision point currently marked in step S4031, and then step 21 is performed again, until the behavior points along the edge of a preset obstacle-crossing grid number are marked. The grid meeting the optimal condition along the edge is marked as a new collision point and saved in a set of the behavior points along the edge. A subsequent direction along the edge of the robot can be classified into a left direction along the edge and a right direction along the edge from a center position of the robot by means of the behavior points along the edge. The robot in the left direction along the edge moves clockwise along the edge of the obstacle. The robot in the right direction along the edge moves anticlockwise along the edge of the obstacle. Then, the robot walks along the edge of the obstacle according to the behavior points along the edge, so that the robot can cross the obstacle along a correct path and can rapidly get rid of a problem of collision with the obstacle. When the obstacle points meeting the closest distance condition are not searched out in step 21, it is determined that the left predicted path along the edge and/or the right predicted path along the edge cannot be planned. Alternatively, when the grids meeting the pre-condition along the edge are not searched out in step 22, it is determined that the left predicted path along the edge and/or the right predicted path along the edge cannot be planned.

Therefore, in this embodiment, by iteratively performing step 21 to step 24, within a reasonable number of the grids, the planned grids meeting the obstacle-crossing condition along the edge are marked as new collision point, so that the predicted path along the edge corresponding to the walking of the robot around the edge of the obstacle is planned. Therefore, the robot can predict a path along the edge by depending on the edges of the obstacles in the map.

In the above embodiment, in step 23, the grid meeting the optimal condition along the edge includes: a grid that is closest to the edge of the obstacle from a connecting line of a center position of the robot is selected from the grids meeting the pre-condition along the edge, that is, a grid of which an included angle between the connecting line of the grid selected in the step and the center position of the robot and a tangent line of a contour line of the obstacle currently colliding is minimum, or forming a grid of which included angle between the connecting line of the grid selected in the step and the center position of the robot and one coordinate axis of a robot coordinate system is minimum. Since an included angle between the connecting line of the grid meeting the optimal condition along the edge and the center position of the robot and the other coordinate axis of the robot coordinate system is maximum, the predicted path along the edge composed of the grids planned and determined in this embodiment can approach a contour line of the obstacle to the utmost extent. During the planning of the predicted path along the edge, the center position of the robot is fixed.

In particular, when the counting number of the grids meeting the pre-condition along the edge reaches a second preset grid number, the grid that is closest to the edge of the obstacle from the connecting line of the center position of the robot is selected from the grids according to a relative position relationship between the grids meeting the pre-condition along the edge and the center position of the robot, to meet the obstacle-crossing condition along the edge. In this embodiment, on the premise of meeting a certain counting number, a predicted path along the edge with a reasonable length is planned, so that a calculation quantity of relative positions is reduced, and the processing efficiency of robot navigation obstacle crossing can be enhanced.

Generally, a method for calculating the relative position relationship between the grids meeting the pre-condition along the edge and the center position of the robot includes: a robot coordinate system is established by using the center position of the robot as an original point, a right-side direction of a body of the robot as an X-axis positive direction, and a current forward direction of the robot as a Y-axis positive direction. It is noted that the X-axis direction and the Y-axis direction of the coordinate system are not unique and fixed, but it is required to consider the positioning of the robot in the forward direction. In this embodiment, on the established robot coordinate system, a coordinate value and an angle value of each grid meeting the optimal condition along the edge are respectively calculated relative to an original point of the robot coordinate system. In this embodiment, in a world coordinate system XOY and the robot coordinate system X'O'Y', a center point (the center position of the robot) of the robot is an original point of the robot coordinate system. When a coordinate and angle of the robot in the world coordinate system are determined, the world coordinates of each collision point, obstacle point, and the behavior points along the edge relative to the center position of the robot can be converted by a formula for converting a machine coordinate into a world coordinate in the prior art. In this embodiment, by using a local coordinate system of the robot to participate in the coordinate calculation of the planned grids, the coordinate calculation of relevant grids is reasonable and accurate.

Preferably, the collision point includes a front collision point, a left collision point, and a right collision point. Considering costs, in this embodiment, two collision detectors are arranged on the robot. The detection capability of the two collision detectors can be identical. Since the collision detector needs to collide with the obstacle to realize the collision point detection of the obstacle, the collision detector needs to be arranged within a 180-degree angle range of a front half sector of a robot base. Herein, a sector surface can be divided into two equal parts, and the angle value of each part is 90 degrees. A left collision detector is disposed at a left front portion of the body of the robot. In this embodiment, the left collision detector is located at a midpoint of an arc line of a small sector on the left side of the body and configured to detect an obstacle collided on a left side of the forward direction of the robot. Specifically, the left collision detector is configured to detect the obstacle collided by the left side of the body when the robot walks along an edge anticlockwise along the edge of the obstacle, and a collision point on the obstacle in a corresponding direction is marked as a left collision point. A right collision detector is disposed at a right front portion of the body of the robot. In this embodiment, the right collision detector is located at a midpoint of an arc line of a small sector on the right side of the body and configured to detect an obstacle collided on a right side of the forward direction of the robot, so as to detect the obstacle collided by the right side of the body when the robot walks along an edge clockwise along the edge of the obstacle, and a collision point on the obstacle in the corresponding direction is marked as a right collision point. The left collision detector and the right collision detector are symmetrically disposed on the left and right sides of the body of the robot. Since the detection capability of the left collision detector and the right collision detector is identical, if a collision occurs at the junction of the two small sectors, the collision detectors at the two small sectors have a same collision intensity. That is to say, when a front side of the robot collides with the obstacle, the left collision detector and the right collision detector are triggered simultaneously, and the collision point on the obstacle in the corresponding direction is marked as the front collision point. In this way, the front collision point, the left collision point, and the right collision point marked by the robot are respectively located on the tangent line of the contour line of the obstacle with which the front side of the robot collides. The contour line of the obstacle is marked and formed on the grid map. Therefore, the robot can walk along the edge around different side edges of the same obstacle, and the robot is adapted to cross different obstacles in a manner of walking along the edge.

It is noted that, under the same robot coordinate system, if a map position where the center of the body of the robot is located is equivalent to the original point of the robot coordinate system, in this embodiment, the center of the body of the robot is regarded as the original point of the center position of the robot. In order to realize that the front collision point, the left collision point, and the right collision point marked by the robot at the same position are all located on the tangent line of the contour line of the obstacle with which the front side of the robot collides, when the robot collides with the obstacle at the original point position (0, 0), if a coordinate of the left collision point is recorded as (−2, 2), a coordinate of the right collision point is recorded as (2, 2), and a coordinate of the front collision point is recorded as (0, 2). Therefore, the robot is in the original point position (0, 0). When the robot detects that there is a collision at the coordinate (−2, 2) (the left collision point), it is determined that the obstacle is collided on the left side of the forward direction of the robot. When the robot detects that there is a collision at the coordinate (2, 2) (the right collision point), it is determined that the obstacle is collided on the right side of the forward direction of the robot. When the robot detects that there is a collision at the coordinate (0, 2) (the front collision point), it is determined that the obstacle is collided in the forward direction of the robot.

In addition, in this embodiment, according to the fact that the farther the collision point being from the collision detector, the smaller the collision intensity, it can be concluded that if the collision intensity in each small sector is measured by the collision detector in the sector, the intersection point between the various sectors is the collision point with the minimum collision intensity after the collision occurs, that is, the front collision point. To sum up, a collision strength threshold can be set to be less than the collision strength of the front collision point. According to the threshold, when the robot collides with the obstacle, only the collision intensity of the collision detector in a small sector is greater than the threshold, so that the robot identifies only one collision detector detecting the obstacle at a time. Therefore, the collision detector realizes the regional detection of obstacles in front of the robot, which facilitates the subsequent planning and determination of the direction along the edge. The magnitude of the threshold varies with the angle of the small sector. The angle of the small sector is related to the number of the collision detectors. Therefore, the collision intensity threshold needs to change with the number of collision detectors arranged on the robot.

As an embodiment, a method for selecting the grid that is closest to the edge of the obstacle from the connecting line of the center position of the robot from the grids according to the relative position relationship between the grids meeting the pre-condition along the edge and the center position of the robot includes the following operation.

When the collision point currently marked in step S4031 is the left collision point, a grid that meets the pre-condition along the edge, is distributed anticlockwise along the edge of the obstacle relative to the current position of the robot, and has a maximum angle value relative to the current position of the robot is selected as the grid meeting the optimal condition along the edge, and the connecting line between the grid and the current position of the robot is closest to the right side edge of the obstacle, so that the grids meeting the optimal condition along the edge are connected to form the right predicted path along the edge. On the whole, it is equivalent to the grid meeting the obstacle-crossing condition along the edge, so that the connecting line between the grid and the current position of the robot is closest to the edge of the obstacle, so as to determine a reference direction along the edge (an anticlockwise direction) of the robot for obstacle crossing along the edge. It is to be noted that, during the walking of the robot along the edge of the obstacle, there is a right behavior along the edge. The robot can move anticlockwise along the right-side edge (contour line) of the obstacle. That is to say, the reference direction along the edge of the robot is determined to be the anticlockwise direction. Therefore, a grid that meets the pre-condition along the edge and is distributed anticlockwise along the edge of the obstacle relative to the current position of the robot is first determined and selected, so that the robot is controlled to successively traverse and select the grids meeting the optimal condition along the edge from the current position later, so as to move anticlockwise along the edge (contour line) of the obstacle. Then, based on this, by calculating the angle information of the grids meeting requirements, the grids meeting the pre-condition along the edge and with a maximum angle value (the included angle formed in the X-axis positive direction relative to the robot coordinate system established in the foregoing embodiment) are screened relative to the current position of the robot as the grids meeting the optimal condition along the edge. It is equivalent that in a second preset grid number of the grids meeting the pre-condition along the edge, the grids that the connecting line with the current position of the robot is closest to the edge of the obstacle are selected, so that the grids meeting the obstacle-crossing condition along the edge are acquired. Then, the robot during walking along the edge (contour line) moves anticlockwise along the edge of the obstacle according to the predicted path along the edge planned by the grids meeting the obstacle-crossing condition along the edge. After the robot crosses the behavior points along the edge of a certain grid number, the robot can cross the right-side edge of the obstacle. It is to be noted that, the obstacle-crossing condition along the edge is required to be met while the closest distance condition and the pre-condition along the edge are met simultaneously.

Likewise, when the collision point currently marked in step S4031 is the right collision point, a grid that meets the pre-condition along the edge, is distributed clockwise around the edge of the obstacle relative to the current position of the robot, and has a minimum angle value relative to the current position of the robot is selected as the grid meeting the optimal condition along the edge, and the connecting line between the grid and the current position of the robot is closest to the left side edge of the obstacle, so that the grids meeting the optimal condition along the edge are planned to be the left predicted path along the edge. On the whole, it is equivalent to the grid meeting the obstacle-crossing condition along the edge, so that the connecting line between the grid and the current position of the robot is closest to the edge of the obstacle, so as to determine a reference direction along the edge (a clockwise direction) of the robot for obstacle crossing along the edge. It is to be noted that, during the walking of the robot along the edge of the obstacle, there is a left behavior along the edge. The robot moves clockwise along the left side edge (contour line) of the obstacle. That is to say, the reference direction along the edge of the robot is determined to be the clockwise direction. Therefore, a grid that meets the pre-condition along the edge and is distributed clockwise along the edge of the obstacle relative to the current position of the robot is first determined and selected, in a process that the robot then successively traverses the grids meeting the obstacle-crossing condition along the edge from the current position later, the robot is controlled to move clockwise along the edge (contour line) of the obstacle. Then, based on this, by calculating the angle information of the grids meeting requirements, the grids meeting the pre-condition along the edge and with a minimum angle value (the included angle formed in the X-axis positive direction relative to the robot coordinate system established in the foregoing embodiment, the X-axis positive direction points toward the right side of the same obstacle) are screened relative to the current position of the robot as the grids meeting the optimal condition along the edge. It is equivalent that in the second preset grid number of the grids meeting the pre-condition along the edge, the grids that the connecting line with the current position of the robot is closest to the edge of the obstacle are selected, so that the grids meeting the obstacle-crossing condition along the edge are acquired and marked as the behavior points along the edge. Then, the robot during walking along the edge moves clockwise along the edge (contour line) of the obstacle according to the predicted path along the edge planned by the behavior points along the edge. After the robot crosses the behavior points along the edge of a certain grid number, the robot can cross the left side edge of the obstacle. It is to be noted that, the obstacle-crossing condition along the edge is required to be met while the closest distance condition and the pre-condition along the edge are met simultaneously.

The angle of the grid meeting the obstacle-crossing condition along the edge relative to the center position (the center of the body of the robot) of the robot is a deflection angle of the connecting line of the grid meeting the obstacle-crossing condition along the edge relative to the center position (the center of the body of the robot) of the robot relative to the X-axis positive direction of the robot coordinate system. The magnitude of the deflection angle is related to an arrangement position of an X axis, especially the relationship between the X-axis positive direction and the distribution position of the obstacle. In this way, the connecting line between the selected grid meeting the obstacle-crossing condition along the edge and the center position of the robot is guaranteed to be closest to the edge of the obstacle, thereby planning the shortest predicted path along the edge.

Limited by a shape, an outline, and distribution position of the obstacle with which the robot currently collides, if the connecting line of the grid meeting the obstacle-crossing condition along the edge relative to the center position (the center of the body of the robot) of the robot gets closer to the X-axis positive direction, the corresponding deflection angle is smaller, and vice versa, but it is required to ensure that the robot successfully crosses the obstacle by means of the obstacle-crossing condition along the edge without colliding with the obstacle frequently. In this embodiment, a predicted path along the edge that the robot crosses the obstacle according to an optimal angle direction is planned, the grids that support the robot to do clockwise or anticlockwise movement around the edge of the obstacle are planned. A walking path of the robot along the edge can be planned according to a shape feature of the obstacle. Therefore, the probability of the robot failing to cross the obstacle is reduced. According to the technical solution, by limiting an extreme value of the angle in the direction along the edge, the number of collisions of the robot during obstacle crossing can be effectively reduced, and the speed that the robot crosses the obstacle can be accelerated.

As an embodiment, a method for planning the predicted path along the edge configured to cause the robot to cross an obstacle includes the following specific steps.

At step S501, after the robot collides with the obstacle, or after the robot collides with the obstacle in a current navigation position, a point that the robot collides with the obstacle is defined as a collision point, and the collision point is marked on a grid map with pre-marked obstacle information, and then step S502 is performed.

At step S502, a first preset searching region is established by using the collision point currently marked in step S501 as a center and a first preset grid number as a radius, and the step S503 is performed. The first preset grid number is preferably 3 grids. Step S502 is used for searching all of the grids that are less than 3 grid lengths from the collision point currently marked in the step S501. A distance comparison between the grids can be a distance comparison between grid coordinate points. Therefore, the robot is prevented from deviating too far from the obstacle during subsequent walking along the edge.

At step S503, an obstacle point that is closest to the collision point currently marked in step S501 and is not marked as the collision point is searched in the first preset searching region as the obstacle point meeting the closest distance condition, and then step S504 is performed. It is to be noted that, before the behavior point along the edge is planned, the collision point currently marked in step S501 is a collision point that is marked by the robot on the grid map with pre-marked obstacle points by performing step S4031, and is the first collision point marked on the grid map with pre-marked obstacle points. The obstacle point selected in step S503 is configured to enclose a shape of an outline where the obstacle collides with the robot.

Preferably, when the obstacle points meeting the closest distance condition are not searched out in step S503, that the two predicted paths along the edge configured to cause the robot to cross an obstacle and having opposite directions along the edge cannot be planned is successively determined, and then step S404 is performed again. Wrong direction along the edge is prevented from being selected during obstacle crossing, so that the robot deviates from the navigation target point during walking along the edge.

At step S504, in a neighborhood of the obstacle points searched in step S503, grids traversed and marked by the robot except for the obstacle points and planned grid points along the edge are selected as the grids meeting the pre-condition along the edge. Then step S505 is performed. In a range of 8 grids of the neighborhood of the obstacle points searched in step S503, by searching the grids in addition to the obstacle points and the planned grid points along the edge in the grids traversed and marked by the robot, in an aspect, it is ensured that the robot is passable in the grids meeting the pre-condition along the edge. In another aspect, the robot is prevented from repeatedly walking in regions that have been planned with the predicted paths along the edge, so that the traversal repetition rate of the robot in a navigation region along the edge is reduced.

Preferably, when the grids meeting the pre-condition along the edge are not searched out in step S504, that the two predicted paths along the edge configured to cause the robot to cross an obstacle and having opposite directions along the edge cannot be planned is successively determined, and then step S404 is performed again. Wrong direction along the edge is prevented from being selected during obstacle crossing, so that the robot deviates from the navigation target point during walking along the edge.

At step S505, the number of the grids meeting the pre-condition along the edge in step S504 is counted, and when the grid meeting the pre-condition along the edge is counted, the relative position relationship between the grid meeting the pre-condition along the edge and the center position of the robot is calculated. Then step S506 is performed. In this way, the grids for guiding the robot to walk in a correct direction along the edge are conveniently screened later.

At step S506, when the counting number in step S505 reaches a second preset grid number, the grid that is closest to the edge of the obstacle from the connecting line of the center position of the robot is selected according to the relative position relationship between the grids meeting the pre-condition along the edge and the center position of the robot, to serve as the grid meeting the optimal condition along the edge, and then step S507 is performed. The grid meeting the optimal condition along the edge screened in step S506 is the grid meeting the obstacle-crossing condition along the edge, which is subsequently and directly configured to plan the predicted path along the edge with a reasonable length. Therefore, the calculation quantity of relative positions is reduced, and the processing efficiency of robot navigation obstacle crossing can be enhanced.

At step S507, the grid point selected in step S506 is marked as a new collision point, added to the predicted path along the edge corresponding to the walking of the robot along the edge of the obstacle, and marked as a newly planned behavior point along the edge; the behavior point along the edge is saved in a memory of the predicted path along the edge inside the robot, and is configured to cause the robot to walk and traverse later, so as to cross the obstacle; meanwhile, the new collision point is updated as the collision point currently marked in step S501; and then, step S508 is performed.

At step S508, whether the behavior points along the edge of a preset obstacle-crossing grid number are marked is determined, if so, the method for planning the predicted path along the edge is stopped, to cause the robot to walk along the edge to the planned behavior point along the edge, otherwise, step S502 is performed again, according to the foregoing steps, the updated currently marked collision point is used to continuously select the grid meeting the obstacle-crossing condition along the edge, and the selected grid is marked as the newly planned behavior point along the edge on the predicted path along the edge configured to cause the robot to walk along the edge of the obstacle. Step S508 is used for determining whether the behavior points along the edge are fully stored in the memory of the predicted path along the edge inside the robot. From the center position of the robot, the behavior points along the edge of a preset obstacle-crossing grid number are sufficient to be planned into the predicted path along the edge crossing the obstacle collided at the center position. It is to be noted that, the selection and calculation of the above grids can be regarded as the selection and calculation of the corresponding grid coordinate points.

By performing the foregoing step S501 to step S508, when the collision point currently marked in step S501 is the right collision point, a grid that meets the pre-condition along the edge, is distributed clockwise along the edge of the obstacle relative to the current position of the robot, and has a minimum angle value relative to the current position of the robot is selected as the grid meeting the optimal condition along the edge, to cause the grid meeting the optimal condition along the edge to be planned as the left predicted path along the edge, so that the robot having the left behavior along the edge moves clockwise along the left side edge (contour line) of the obstacle. When the collision point currently marked in step S501 is the left collision point, a grid that meets the pre-condition along the edge, is distributed anticlockwise along the edge of the obstacle relative to the current position of the robot, and has a maximum angle value relative to the current position of the robot is selected as the grid meeting the optimal condition along the edge, to cause the grid meeting the optimal condition along the edge to be planned as the right predicted path along the edge, so that the robot having the right behavior along the edge moves anticlockwise along the right side edge (contour line) of the obstacle. Therefore, the two predicted paths along the edge configured to cause the robot to cross an obstacle and having opposite directions along the edge respectively are a left predicted path along the edge and a right predicted path along the edge.

Based on all of the above embodiments, a method for controlling an obstacle-crossing for a robot is further disclosed, including: a robot is controlled to perform the foregoing obstacle-crossing termination determination method; when current obstacle crossing performed by the robot is determined to be terminated, the robot is controlled to stop walking along an edge according to a pre-selected shortest predicted path along the edge to end obstacle crossing; and when the current obstacle crossing performed by the robot is determined to not be terminated, the robot is controlled to continuously walk along the edge according to the pre-selected shortest predicted path along the edge to end obstacle crossing, and the obstacle-crossing termination determination method is performed simultaneously and continuously. Compared with the prior art, in this embodiment, the robot is prevented from walking around the obstacle endlessly, and the robot can timely switch back to the navigation path after crossing the obstacle, thereby enhancing the navigation efficiency of the robot.

The obstacle-crossing control method further includes: after the robot stops walking along the edge according to the pre-selected shortest predicted path along the edge, the robot is controlled to walk according to a preset navigation path; after detecting that the robot collides with an obstacle, the shortest predicted path along the edge is planned and selected; and then the obstacle-crossing termination determination method is returned to perform, and so on, until the robot is navigated to a final navigation target point. In this way, the navigation of the robot that is original set cannot interrupt due to obstacle crossing, so that the navigation efficiency of the robot can be enhanced.

Preferably, in a process that the robot walks along the edge according to the pre-planned shortest predicted path along the edge, when a rotation angle and walking mileage of the robot along the edge within preset time along the edge meet corresponding limiting conditions, the current obstacle crossing performed by the robot is determined to be not terminated, and then the robot is controlled to continuously walk along the edge according to the shortest predicted path along the edge, otherwise the robot is controlled to stop walking along the edge according to the pre-selected shortest predicted path along the edge to end obstacle crossing. For specific steps, refer to the corresponding method steps in the foregoing embodiments, which is not described herein again. According to this embodiment, an obstacle-crossing operation of the robot along the edge is terminated in advance, to cause the robot to select to give up the current shortest predicted path along the edge in advance. Therefore, the robot is prevented from deviating too far from the final navigation target point because the robot walks along the edge for a long time.

A chip stores a program code. When the program code is performed by the chip, the foregoing obstacle-crossing termination determination method is implemented, or the foregoing obstacle-crossing control method is implemented. The logic and/or steps represented in flowcharts or otherwise described herein, for example, can be considered an ordered list of executable instructions for implementing the logical functions, can be embodied in any computer-readable media for use of an instruction execution system, apparatus or devices (such as a computer-based system, a system including a processor, or other system that can load and execute instructions from an instruction execution system, apparatus or apparatus) or with reference to such instruction execution systems, apparatus or devices. For the purposes of this specification, a "computer-readable medium" can be any device that can include, store, communicate, propagate, or transport the program for use by or in combination with the instruction execution system, apparatus, or devices. More specific examples (non-exhaustive list) of the computer-readable medium include the following: electrical connecting portions (electronic devices) including one or more wires, portable computer disk boxes (magnetic devices), random access memory (RAM), Read Only Memory (ROM), Erasable Editable Read Only Memory (EPROM or Flash Memory), fiber optic devices, and Compact Disc Read Only Memory (CDRCM). In addition, the computer-readable medium can even be paper or other suitable medium on which the program can be printed, as it can be done, for example, by optically scanning the paper or other medium, followed by editing, interpretation or other suitable means if necessary process to obtain the program electronically and then store the program in a computer memory.

A robot is provided. A left collision detector is disposed at a left front portion of the body of the robot and configured to detect an obstacle collided on a left side of the forward direction of the robot, so as to detect the obstacle collided by the left side of the body when the robot walks along an edge anticlockwise along the edge of the obstacle. A right collision detector is disposed at a right front portion of the body of the robot and configured to detect an obstacle collided on a right side of the forward direction of the robot, so as to detect the obstacle collided by the right side of the body when the robot walks along an edge clockwise along the edge of the obstacle. The robot is provided with the chip. The chip is connected to the left collision detector and the right collision detector. The robot is configured to perform the foregoing obstacle-crossing control method. The left collision detector and the right collision detector are symmetrically disposed on the left and right sides of the body of the robot. When a front side of the robot collides with the obstacle, the left collision detector and the right collision detector are simultaneously triggered for detection, to cause the front collision point, the left collision point, and the right collision point of the robot marked in a same position to be located on a tangent line of a contour line of the obstacle collided with the front side of the robot. The contour line of the obstacle is marked and formed on the grid map.

The above embodiments are merely for illustrating the technical concept and characteristics of the present disclosure, and the purpose thereof is to enable those skilled in the art to understand the content of the present disclosure and implement the content accordingly, and cannot limit the protection scope of the present disclosure with this. All equivalent transformations or modifications made according to the spirit of the present disclosure shall fall within the protection scope of the present disclosure.

What is claimed is:

1. A method for determining a termination of an obstacle-crossing for a robot, comprising:

selecting a second preset inflection point set that meets a guiding condition from a preset navigation path when the robot walks along an edge according to a pre-planned shortest predicted path along the edge, wherein the navigation path is set before the robot starts a navigation, the shortest predicted path along the edge is planned and selected when the robot collides with an obstacle during the navigation;

acquiring an optimal inflection point from the second preset inflection point set that meets the guiding condition, so as to cause the optimal inflection point to be an inflection point that a distance between all of inflection points of the second preset inflection point set that meets the guiding condition and a current position of the robot is closest to an obstacle-crossing determination threshold value; and determining whether the obstacle is marked on a line segment that connects the optimal inflection point and the current position of the robot, in a case that the obstacle is marked on the line segment that connects the optimal inflection point and the current position of the robot, determining that a current obstacle crossing performed by the robot is not terminated, otherwise, determining that the current obstacle crossing performed by the robot is terminated.

2. The obstacle-crossing termination determination method according to claim 1, wherein a method for acquiring the optimal inflection point from the second preset inflection point set that meets the guiding condition, so as to cause the optimal inflection point to be the inflection point that the distance between all of the inflection points of the second preset inflection point set that meets the guiding condition and the current position of the robot is closest to the obstacle-crossing determination threshold value comprises:

presetting the obstacle-crossing determination threshold value;

respectively calculating a distance between each inflection point in the second preset inflection point set that meets the guiding condition and the current position of the robot, and then subtracting the distances from the obstacle-crossing determination threshold value to acquire absolute values of corresponding difference values; and comparing the absolute values of the difference values between the distance between each inflection point in the second preset inflection point set that meets the guiding condition and the current position of the robot and the obstacle-crossing determination threshold value, selecting the inflection point corresponding to the minimum absolute value of the difference values as the optimal inflection point, so as to cause the optimal inflection point to be the inflection point that the distance between all of the inflection points of the second preset inflection point set that meets the guiding condition and the current position of the robot is closest to the obstacle-crossing determination threshold value.

3. The obstacle-crossing termination determination method according to claim 2, wherein a method for determining whether the obstacle is marked on the line segment that connects the optimal inflection point and the current position of the robot, in a case that the obstacle is marked on the line segment that connects the optimal inflection point and the current position of the robot, determining that the current obstacle crossing performed by the robot is not terminated, otherwise, determining that the obstacle crossing performed by the robot is terminated comprises:

on the line segment that connects the current position of the robot and the optimal inflection point, determining one by one whether grid coordinates passed by the line segment have a same grid coordinate as a coordinate of an obstacle point pre-marked on a grid map, in a case that the grid coordinates passed by the line segment have the same grid coordinate as the coordinate of the obstacle point pre-marked on a grid map, determining that there is an obstacle on the line segment that connects the current position of the robot and the optimal inflection point, and then determining that the current obstacle crossing performed by the robot is not terminated, otherwise, determining that there is no obstacle on the line segment that connects the current position of the robot and the optimal inflection point, and then determining that the current obstacle crossing performed by the robot is terminated.

4. The obstacle-crossing termination determination method according to claim 1, wherein the method further comprises: determining whether a rotation angle and a walking mileage of the robot along the edge within a preset time along the edge meet corresponding limiting conditions during a process of the robot walking along the edge according to the pre-planned shortest predicted path along the edge, in a case that the rotation angle and the walking mileage of the robot along the edge within the preset time along the edge meet corresponding limiting conditions during the process of the robot walking along the edge according to the pre-planned shortest predicted path along the edge, determining that the robot is not trapped in a same position, and then determining that the current obstacle crossing performed by the robot is not terminated, otherwise, determining that the robot is trapped in the same position, to determine that the current obstacle crossing performed by the robot is terminated.

5. The obstacle-crossing termination determination method according to claim 4, wherein a method for determining whether the rotation angle and the walking mileage of the robot along the edge within the preset time along the edge meet the corresponding limiting conditions during the process of the robot walking along the edge according to the pre-planned shortest predicted path along the edge, in a case that the rotation angle and the walking mileage of the robot along the edge within the preset time along the edge meet corresponding limiting conditions during the process of the robot walking along the edge according to the pre-planned shortest predicted path along the edge, determining that the robot is not trapped in the same position, otherwise, determining that the robot is trapped in the same position specifically comprises:

when a time for timing the robot walking along the edge reaches the preset time along the edge, determining that the robot is not trapped in the same position, and then determining that the current obstacle crossing performed by the robot is not terminated, if the rotation angle of the robot along the edge is determined to be less than or equal to a preset maximum rotation angle and the walking mileage of the robot along the edge is determined to be less than or equal to a preset maximum distance along the edge; and when the time for timing the robot walking along the edge reaches or exceeds the preset time along the edge, determining that the robot is trapped in the same position, and then determining that the current obstacle crossing performed by the robot is terminated, if the rotation angle of the robot along the edge is determined to be greater than the preset maximum rotation angle and the walking mileage of the robot along the edge is determined to be greater than the preset maximum distance along the edge, wherein the rotation angle of the robot along the edge is a result of accumulating angle increments of a gyroscope that is regularly read by the robot.

6. The obstacle-crossing termination determination method according to claim 5, wherein a method for planning the shortest predicted path along the edge comprises:

planning a predicted path along the edge that is configured to cause the robot to cross an obstacle first, and selecting a first preset inflection point set that meets the guiding condition from the preset navigation path, wherein the navigation path connected by inflection points is preset for the robot, the inflection points are configured to guide the robot to move to a final navigation target point, and the predicted path along the edge comprises two predicted paths along the edge with opposite directions along the edge; and then according to distance information between all of behavior points along the edge on each predicted path along the edge and inflection points of the first preset inflection point set that meets the guiding condition on the same navigation path, selecting a predicted path along the edge with a minimum deviation from the navigation path as the shortest predicted path along the edge.

7. The obstacle-crossing termination determination method according to claim 6, wherein, when the robot does not walk on a planned shortest predicted path along the edge, the first preset inflection point set that meets the guiding condition is selected from the preset navigation path;

when the robot walks along the edge on the planned shortest predicted path along the edge, the second preset inflection point set that meets the guiding condition is selected from the preset navigation path; and both the first preset inflection point set and the second preset inflection point set are composed of inflection points on the navigation path that meet the guiding condition.

8. The obstacle-crossing termination determination method according to claim 7, wherein the guiding condition is specifically expressed as:

selecting a target inflection point from the navigation path, and then by determining whether the target inflection point and one or two inflection points consecutively set along a navigation forward direction of the navigation path from the target inflection point have the final navigation target point, and then selecting the first preset inflection point set that meets the guiding condition or the second preset inflection point set that meets the guiding condition, wherein the navigation forward direction of the navigation path is a robot navigation direction for guiding the robot to move to the final navigation target point; and the final navigation target point is a termination point of the navigation path, and also belongs to one of the inflection points of the navigation path.

9. The obstacle-crossing termination determination method according to claim 8, wherein, when it is determined that neither of the two inflection points consecutively set along the navigation forward direction of the navigation path from the target inflection point is the final navigation target point, the first preset inflection point set that meets the guiding condition or the second preset inflection point set that meets the guiding condition is determined comprises: the target inflection point, and two inflection points consecutively set along the navigation forward direction of the navigation path from the target inflection point on the navigation path;

when it is determined that a first inflection point or a second inflection point consecutively set along the navigation forward direction of the navigation path from the target inflection point is the final navigation target point, the first preset inflection point set that meets the guiding condition or the second preset inflection point set that meets the guiding condition is determined comprises: all of inflection points that are arranged along the navigation forward direction of the navigation path from the target inflection point to the final navigation target point on the navigation path, wherein the target inflection point and the final navigation target point are also comprised; and the first inflection point is adjacent to the target inflection point in the navigation forward direction of the navigation path, and the second inflection point is adjacent to the first inflection point in the navigation forward direction of the navigation path; and when it is determined that the target inflection point selected on the navigation path is the final navigation target point, the first preset inflection point set that meets the guiding condition or the second preset inflection point set that meets the guiding condition has only the final navigation target point.

10. The obstacle-crossing termination determination method according to claim 9, wherein a method for specifically selecting the target inflection point on the preset navigation path comprises:

establishing an inflection point comparison region composed of grid coordinates that use the current position of the robot as a center and a maximum distance from the current position of the robot as a first preset distance threshold value, wherein when the first preset inflection point set that meets the guiding condition is selected from the preset navigation path, the current position of the robot is not on the planned shortest predicted path along the edge; when the second preset inflection point set that meets the guiding condition is selected from the preset navigation path, the current position of the robot is on the planned shortest predicted path along the edge;

when the inflection point comparison region only has one inflection point, selecting and recording the inflection point as the target inflection point;

when the inflection point comparison region has two or more than two inflection points, in inflection points with distances from the current position of the robot being less than the first preset distance threshold value, selecting and recording an inflection point that is closest to the final navigation target point in the navigation forward direction of the navigation path as the target inflection point; and when the inflection point comparison region has no inflection points, along the navigation forward direction of the navigation path, selecting an inflection point that is adjacent to a target inflection point recently marked by the robot on the navigation path to record as a new target inflection point, wherein when a distance between the current position of the robot and one of the inflection points is less than a second preset distance threshold value, the current position of the robot is determined to coincide with the inflection point; and the second preset distance threshold value is less than the first preset distance threshold value.

11. The obstacle-crossing termination determination method according to claim 10, wherein the navigation path is formed by connecting a set of inflection points that are orderly distributed, and planned serial numbers of the inflection points arranged along the navigation forward direction of the navigation path increase sequentially on the navigation path; and planned serial numbers of the inflection points of the first preset inflection point set or the second preset inflection point set increase sequentially, and inflection points of which planned serial numbers are less than a planned serial number of a target inflection point in the corresponding inflection point set is recorded as inflection points traversed by the robot, wherein a planned serial number of the final navigation target point is the greatest, so as to cause planned serial numbers corresponding to inflection points that are closer to the final navigation target point in the navigation forward direction of the navigation path to be greater.

12. The obstacle-crossing termination determination method according to claim 6, wherein the method for according to the distance information between all of the behavior points along the edge on each predicted path along the edge and the inflection points of the first preset inflection point set that meets the guiding condition on the same navigation path, selecting the predicted path along the edge with the minimum deviation from the navigation path, to cause the robot to walk in a direction along the edge of the selected predicted path along the edge after colliding the obstacle so as to implement obstacle crossing comprises:

the predicted path along the edge comprising a left predicted path along the edge and a right predicted path along the edge, wherein a direction along the edge of the left predicted path along the edge is opposite to a direction along the edge of the right predicted path along the edge;

calculating distances between the inflection points of the first preset inflection point set that meets the guiding condition of the navigation path and a same behavior point along the edge on the left predicted path along the edge, summing the distances to obtain a left local distance sum generated by a behavior point along the edge relative to the first preset inflection point set that meets the guiding condition; then repeating a foregoing calculation step to obtain left local distance sums generated by each behavior point along the edge relative to the first preset inflection point set that meets the guiding condition, and then adding the left local distance sums to acquire a total sum of left distances generated by the left predicted path along the edge relative to the first preset inflection point set that meets the guiding condition, for indicating a degree of a deviation of the left predicted path along the edge relative to the navigation path;

meanwhile, calculating distances between the inflection points of the first preset inflection point set that meets the guiding condition of the navigation path and a same behavior point along the edge on the right predicted path along the edge, summing the distances to obtain a right local distance sum generated by the behavior point along the edge relative to the first preset inflection point set that meets the guiding condition; then repeating a foregoing calculation step to obtain right local distance sums generated by each behavior point along the edge relative to the first preset inflection point set that meets the guiding condition, and then adding the right local distance sums, to acquire a total sum of right distances generated by the right predicted path along the edge relative to the first preset inflection point set that meets the guiding condition, for indicating a degree of a deviation of the right predicted path along the edge relative to the navigation path;

when the total sum of left distances is greater than the total sum of right distances, determining that the right predicted path along the edge is the predicted path along the edge with the minimum deviation from the navigation path, and selecting the right predicted path along the edge as the shortest predicted path along the edge; and when the total sum of right distances is greater than the total sum of left distances, determining that the left predicted path along the edge is the predicted path along the edge with the minimum deviation from the navigation path, and selecting the left predicted path along the edge as the shortest predicted path along the edge, wherein the smaller the total sum of right distances is, the smaller the deviation of the right predicted path along the edge from the navigation path is; and the smaller the total sum of left distances is, the smaller the deviation of the left predicted path along the edge from the navigation path is.

13. The obstacle-crossing termination determination method according to claim 12, wherein before walking according to a currently planned shortest predicted path along the edge, the method further comprises:

determining whether a variation of coordinate positions where the robot is located within a preset time is greater than a distance stabilization threshold value, in a case that the variation of the coordinate positions where the robot is located within the preset time is greater than the distance stabilization threshold value, controlling the robot to plan two predicted paths along the edge with opposite directions along the edge and configured to cause the robot to cross the obstacle, otherwise, controlling the robot to change a direction along the edge, so as to cause the robot to walk in a direction opposite to a currently determined direction along the edge, wherein the currently determined direction along the edge comprises a preset direction along the edge when the robot is powered on and a direction along the edge of a predicted path along the edge with the minimum deviation from the navigation path that is selected last time; and wherein the robot is controlled to walk in the direction opposite to the currently determined direction along the edge if it is determined that the two predicted paths along the edge with opposite directions along the edge and configured to cause the robot to cross the obstacle are unable to be planned, wherein the distance stabilization threshold value is set to a diameter of a body of the robot.

14. The obstacle-crossing termination determination method according to claim 13, wherein a method for planning the predicted path along the edge that is configured to cause the robot to cross the obstacle comprises:

step 1, marking a collision point on a grid map with pre-marked obstacle information after the robot currently collides with the obstacle; and step 2, selecting grids meeting an obstacle-crossing condition along the edge on a neighborhood of a currently marked collision point, and recording the selected grids as behavior points along the edge that are configured to cause the robot to walk along the edge of the obstacle, so as to cause the behavior points along the edge to form the two predicted path along the edge with opposite directions along the edge for the robot to cross the obstacle.

15. The obstacle-crossing termination determination method according to claim 14, wherein a specific method of step 2 comprises:

step 21, searching obstacle points of which distance relationship with the currently marked collision point meets a closest distance condition;

step 22, searching grids meeting a pre-condition along the edge on a neighborhood of the obstacle points searched in step 21;

step 23, when the number of the grids meeting the pre-condition along the edge is counted to reach a second preset grid number, selecting a grid meeting an optimal condition along the edge from the grids meeting the pre-condition along the edge as the grids meeting the obstacle-crossing condition along the edge; and step 24, recording the grid meeting the optimal condition along the edge and selected in step 23 as a new collision point, adding the collision point as a newly planned behavior point along the edge on a corresponding predicted path along the edge for the robot walking along an edge of the obstacle, meanwhile, updating the new collision point as the currently marked collision point, and then returning to perform step 21, until behavior points along the edge of a preset obstacle-crossing grid number are marked, wherein when the obstacle points meeting the closest distance condition are not searched out in step 21, it is determined that the predicted path along the edge is unable to be planned; alternatively, when the grids meeting the pre-condition along the edge are not searched out in step 22, it is determined that the predicted path along the edge is unable to be planned.

16. The obstacle-crossing termination determination method according to claim 15, wherein, in step 23, the grid meeting the optimal condition along the edge comprises:

a grid that is closest to the edge of the obstacle from a connecting line of a center position of the robot is selected from the grids meeting the pre-condition along the edge, wherein the center position of the robot maintains unchanged in a process of planning the predicted path along the edge;

wherein step 23 specifically comprises:

when a counting number of the grids meeting the pre-condition along the edge reaches the second preset grid number, selecting a grid that is closest to the edge of the obstacle from the connecting line of the center position of the robot from the grids according to a relative position relationship between the grids meeting the pre-condition along the edge and the center position of the robot, to meet the obstacle-crossing condition along the edge;

wherein a method for calculating the relative position relationship between the grids meeting the pre-condition along the edge and the center position of the robot comprises:

establishing a robot coordinate system by using the center position of the robot as an original point, a right-side direction of the body of the robot as an X-axis positive direction, and a current forward direction of the robot as a Y-axis positive direction; and on the robot coordinate system, respectively calculating a coordinate value and an angle value of each grid meeting the optimal condition along the edge relative to the original point of the robot coordinate system.

17. The obstacle-crossing termination determination method according to claim 16, wherein the collision point comprises a front collision point, a left collision point, and a right collision point;

a left collision detector is disposed at a left front portion of the body of the robot and configured to detect an obstacle collided on a left side of a forward direction of the robot, so as to detect the obstacle collided by the left side of the body when the robot walks along an edge anticlockwise along the edge of the obstacle, and mark a collision point on the obstacle in a corresponding direction as the left collision point;

a right collision detector is disposed at a right front portion of the body of the robot and configured to detect an obstacle collided on a right side of the forward direction of the robot, so as to detect the obstacle collided by the right side of the body when the robot walks along an edge clockwise along the edge of the obstacle, and mark a collision point on the obstacle in the corresponding direction as the right collision point;

the left collision detector and the right collision detector are symmetrically disposed on the left and right sides of the body of the robot; when a front side of the robot collides with the obstacle, the left collision detector and the right collision detector are simultaneously triggered for detection, and a collision point on the obstacle in a corresponding direction is marked as the front collision, so as to cause the front collision point, the left collision point, and the right collision point of the robot marked in a same position to be located on a tangent line of a contour line of the obstacle collided with the front side of the robot; and the contour line of the obstacle is marked on the grid map.

18. The obstacle-crossing termination determination method according to claim 17, wherein a method for selecting the grid that is closest to the edge of the obstacle from the connecting line of the center position of the robot from the grids according to the relative position relationship between the grids meeting the pre-condition along the edge and the center position of the robot comprises:

when a collision point currently marked in step 1 is the left collision point, selecting a grid that meets the pre-condition along the edge and is distributed anticlockwise along the edge of the obstacle relative to the current position of the robot, and has a maximum angle value relative to the current position of the robot as the grid meeting the optimal condition along the edge, so as to cause the grid meeting the optimal condition along the edge to be connected as the right predicted path along the edge, a reference direction of the robot along the edge is also determined to be an anticlockwise direction; and when the collision point currently marked in step 1 is the right collision point, selecting a grid that meets the pre-condition along the edge and is distributed clockwise along the edge of the obstacle relative to the current position of the robot, and has a minimum angle value relative to the current position of the robot as the grid meeting the optimal condition along the edge, so as to cause the grid meeting the optimal condition along the edge to be connected as the left predicted path along the edge, a reference direction of the robot along the edge is also determined to be a clockwise direction;

wherein, in step 21, the obstacle point meeting the closest distance condition comprises: searching an obstacle point that is closest to the collision point currently marked in step 1 in a first preset searching region and is not marked as the collision point, the first preset searching region is a grid region that is established by using the collision point currently marked in step 1 as a center and a maximum distance from the collision point currently marked in step 1 as a first preset grid number;

before step 24 is performed, the collision point currently marked in step 1 is a first collision point that is marked by the robot on the grid map with pre-marked obstacle points by performing step 1; and after step 24 is performed, the collision point currently marked in step 1 is a new collision point that is marked by the robot in step 24 that is performed at a last time:

wherein, between step 22 and step 23, the method further comprises:

when the grid meeting the pre-condition along the edge is counted, calculating a relative position relationship between the grid meeting the pre-condition along the edge and the center position of the robot;

wherein, in step 22, the grid meeting the pre-condition along the edge comprises:

among 8 grids in a neighborhood of the obstacle points searched in step 21, selecting grids traversed and marked by the robot except for the obstacle points and the behavior points along the edge planned by step 24.

19. A chip, storing a program code thereon, wherein, when the program code is performed by the chip, the obstacle-crossing termination determination method according to claim 1 is implemented.

20. A robot, wherein a left collision detector is disposed at a left front portion of a body of the robot and configured to detect an obstacle collided on a left side in a forward direction of the robot, so as to detect the obstacle collided by the left side of the body when the robot walks along an edge anticlockwise along the edge of the obstacle;

a right collision detector is disposed at a right front portion of the body of the robot and configured to detect an obstacle collided on a right side in the forward direction of the robot, so as to detect the obstacle collided by the right side of the body when the robot walks along an edge clockwise along the edge of the obstacle; and the robot is provided with the chip according to claim 19, the chip is connected to the left collision detector and the right collision detector.

* * * * *